US012762083B2

(12) United States Patent
Muralitharan et al.

(10) Patent No.: US 12,762,083 B2
(45) Date of Patent: Oct. 13, 2026

(54) COARSE-GRAINED RECONFIGURABLE ARCHITECTURE SYSTEM WITH IMPROVED TRAFFIC MANAGEMENT

(71) Applicant: SambaNova Systems, Inc., Palo Alto, CA (US)

(72) Inventors: Sripathi Muralitharan, Mountain View, CA (US); John Philipp Baxley, Arlington, VA (US); Manish K. Shah, Austin, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 213 days.

(21) Appl. No.: 18/818,556

(22) Filed: Aug. 28, 2024

(65) Prior Publication Data

US 2026/0067239 A1 Mar. 5, 2026

(51) Int. Cl.

*G06F 15/78* (2006.01)
*G06F 9/30* (2018.01)
*G06F 15/80* (2006.01)

(52) U.S. Cl.

CPC ...... *G06F 15/7867* (2013.01); *G06F 9/30101* (2013.01); *G06F 15/80* (2013.01)

(58) Field of Classification Search

CPC ............. G06F 15/7867; G06F 15/7889; G06F 15/7892; G06F 15/80; G06F 9/30101; H04L 49/9026; H04L 47/2441; H04L 47/56

See application file for complete search history.

(56) References Cited

U.S. PATENT DOCUMENTS 10,698,853 B1 6/2020 Grohoski et al.
2004/0117755 A1* 6/2004 Blodget ........... H03K 19/17732 716/117
2005/0102573 A1* 5/2005 Sun ..................... G06F 15/7842 714/30
2006/0225139 A1* 10/2006 Takada ................ G06F 15/7867 713/193
2015/0169328 A1* 6/2015 Gupta ................... G06F 9/3877 712/34
2015/0268963 A1* 9/2015 Etsion ................... G06F 9/4881 712/225
2019/0370631 A1 12/2019 Fais et al.
2023/0125149 A1* 4/2023 Shah ....................... G06F 9/485 712/17

(Continued)

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Jyoti Mehta
*Assistant Examiner* — Kasim Alli
(74) *Attorney, Agent, or Firm* — FP; Sikander M. Khan

(57) ABSTRACT

An implementation may include that a coarse-grained reconfigurable (CGR) processor may be configured to receive a network pause command and to responsively transmit data over the network even though the network pause command is active. The transmission rate may be reduced while the network pause command is active.

20 Claims, 11 Drawing Sheets

(56) References Cited

U.S. PATENT DOCUMENTS

| | | | |
|---|---|---|---|
| 2023/0251839 | A1 | 8/2023 | Shah et al. |
| 2023/0251993 | A1 | 8/2023 | Shah et al. |
| 2024/0020261 | A1 | 1/2024 | Jordan et al. |
| 2024/0073129 | A1 | 2/2024 | Shah et al. |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

NVIDIA Spectrum-X Network Platform Architecture, NVIDIA, May 28, 2023, 26 pages.

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

COARSE-GRAINED RECONFIGURABLE ARCHITECTURE SYSTEM WITH IMPROVED TRAFFIC MANAGEMENT

CROSS-REFERENCE TO RELATED APPLICATIONS(S)

This application is related to the following patent applications, and each application is incorporated by reference in its entirety:

U.S. patent application Ser. No. 18/218,562, published as US 2024/0020261, entitled "Peer-To-Peer Route Through In A Reconfigurable Computing System," filed on Jul. 5, 2023;

U.S. patent application Ser. No. 18/383,718, published as US 2024/0073129, entitled "Peer-To-Peer communication between Reconfigurable Dataflow Units," filed Oct. 25, 2023;

U.S. Provisional Patent Application No. 63/390,484, entitled "Peer-To-Peer Route Through In A Reconfigurable Computing System," filed on Jul. 19, 2022;

U.S. Provisional Patent Application No. 63/405,240, entitled "Peer-To-Peer Route Through In A Reconfigurable Computing System," filed on Sep. 9, 2022;

U.S. Provisional Application 63/389,767, entitled "Peer-to-Peer Communication between Reconfigurable Dataflow Units," filed on Jul. 15, 2022;

U.S. patent application Ser. No. 16/239,252, now U.S. Pat. No. 10,698,853, entitled "Virtualization of a Reconfigurable Data Processor," filed Jan. 3, 2019;

U.S. Provisional Patent Application No. 63/349,733, entitled "Head Of Line Blocking Mitigation In A Reconfigurable Data Processor," filed on Jun. 6, 2022;

U.S. patent application Ser. No. 18/107,613, published as US 2023/0251839, entitled "Head Of Line Blocking Mitigation In A Reconfigurable Data Processor," filed on Feb. 9, 2023, and U.S. patent application Ser. No. 18/107,690, published as US 2023/0251993, entitled "Two-Level Arbitration in a Reconfigurable Processor," filed on Feb. 9, 2023.

This application is also related to the following publications, and each publication is incorporated by reference in its entirety:

Prabhakar et al., "Plasticine: A Reconfigurable Architecture for Parallel Patterns," ISCA '17, Jun. 24-28, 2017, Toronto, ON, Canada; and Koeplinger et al., "Spatial: A Language and Compiler for Application Accelerators," Proceedings of the 39th ACM SIGPLAN Conference on Programming Language Design and Implementation (PLDI), Proceedings of the 43rd International Symposium on Computer Architecture, 2018.

BACKGROUND

The present subject matter relates to communication between integrated circuits, more specifically to improved management of communication between elements that communicate with elements of a system.

Reconfigurable processors, including field programmable gate arrays (FPGAs), can be configured to implement a variety of functions more efficiently or faster than might be achieved using a general-purpose processor executing a computer program. So called Coarse-Grained Reconfigurable Architectures (e.g. CGRAs) are being developed in which the configurable units in the array are more complex than used in typical, more fine-grained FPGAs, and may enable faster or more efficient execution of various classes of functions. During communications in such systems previous flow-control mechanisms within the system components often resulted in a stall condition of the communications wherein some system elements were not able to communicate. The stall condition often reduced the effectiveness and performance of the system.

Figure 1:
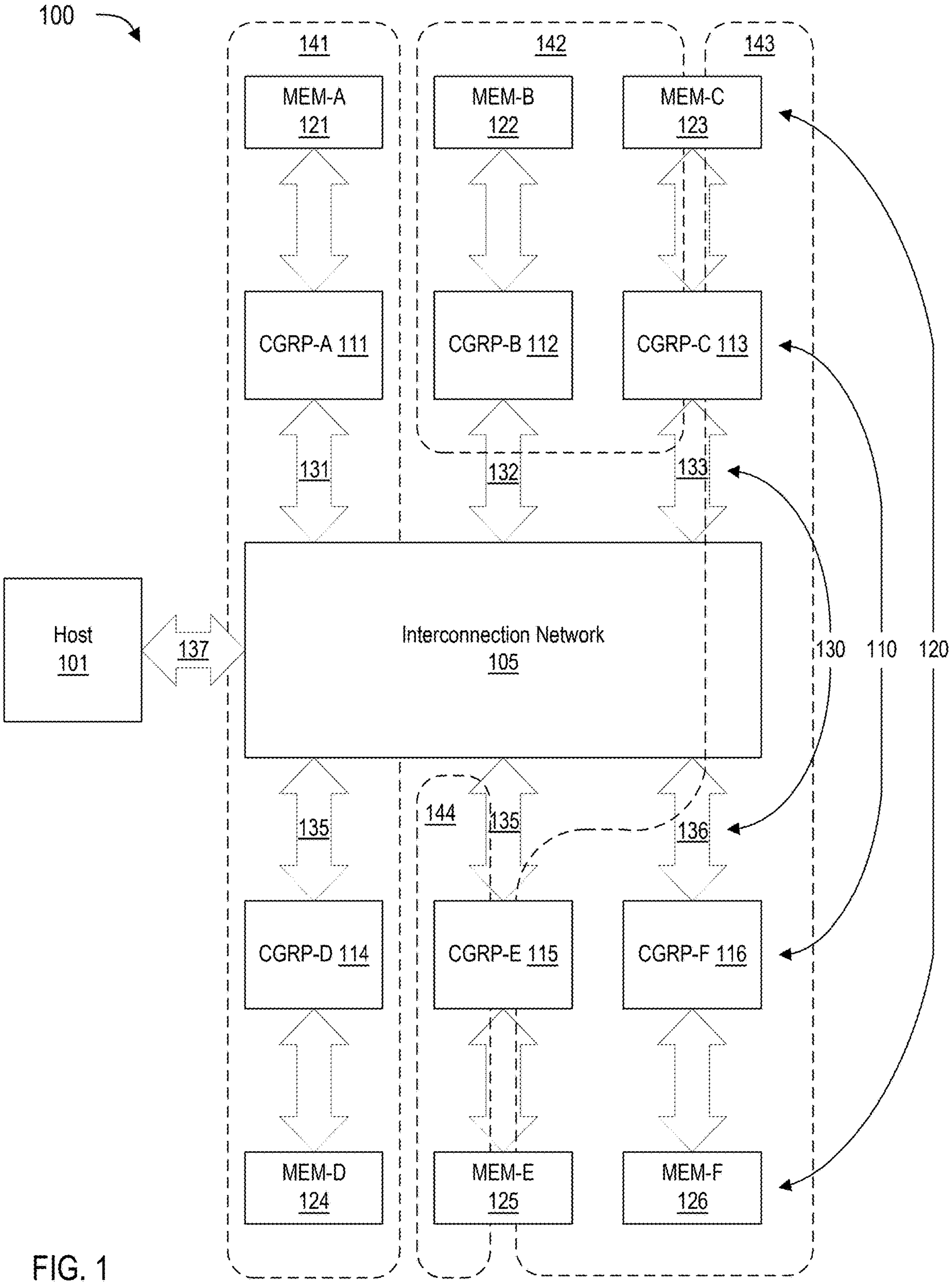
FIG. 1 is a block diagram illustrating an example coarse-grained reconfigurable (CGR) architecture (CGRA) system for extending dataflow graphs across multiple processors of a system, according to an implementation of the present disclosure.

As used herein, the phrase "one of" should be interpreted to mean any of the listed items.

As used herein, the phrases "at least one of" and "one or more of" should be interpreted to mean one or more items. For example, the phrase "at least one of A, B, or C" or the phrase "one or more of A, B, or C" should be interpreted to mean any number of the items of A, B, and/or C.

Unless otherwise specified, the use of ordinal adjectives "first", "second", "third", etc., to describe an object, merely refers to different instances or classes of the object and does not imply any ranking or sequence. The terms first, second, third and the like in the claims or/and in the Detailed Description, as used in a portion of a name of an element, are used for distinguishing between similar elements and not necessarily for describing a sequence, either temporally, spatially, in ranking or in any other manner. It is to be understood that the terms so used are interchangeable under appropriate circumstances and that the implementations or embodiments described herein are capable of operation in other sequences than described or illustrated herein.

The terms "comprising" and "consisting of" have different meanings in this document. An apparatus, method, or product "comprising" (or "including") certain features means that it includes those features but does not exclude the presence of other features. On the other hand, if the apparatus, method, or product "consists of" certain features, the presence of any additional features is excluded.

The term "coupled" is used in an operational sense and is not limited to a direct or an indirect coupling. Coupled in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be indirect through galvanic, capacitive, inductive, electromagnetic, optical, or through any other electrical element or process allowed by physics.

The term "connected" is used to indicate a direct connection, such as electrical, optical, electromagnetic, or mechanical, between the things that are connected, without any intervening things or devices.

The term "configured" to perform a task or tasks is a broad recitation generally meaning having circuitry that performs the task or tasks during operation. As such, the described item or circuit can be configured to perform the task even when the unit/circuit/component is not currently on or active. In general, the circuitry that forms the structure corresponding to "configured to" may include hardware circuits, and may further be controlled by switches, logical or analog electronics, fuses, bond wires, metal masks, firmware, and/or software. Similarly, various items may be described as performing a task or tasks, for convenience in the description. Such descriptions should be interpreted as including the phrase configured to.

The words "during", "while", and "when" as used herein relating to circuit operation are not exact terms that mean an action takes place instantly upon an initiating action but that there may be some small but reasonable delay(s), such as various propagation delays, between the reaction that is initiated by the initial action. Additionally, the term "while" means that a certain action occurs at least within some portion of a duration of the initiating action. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used.

The terms "close", "near", and "about" refer to being within minus or plus 10% of an indicated value, unless explicitly specified otherwise. The use of the word "approximately" or "substantially" means that a value of an element has a parameter that is expected to be close to a stated value or position. However, as is well known in the art there are always minor variances that prevent the values or positions from being exactly as stated. It is well established in the art that variances of up to at least ten percent (10%) are reasonable variances from the ideal goal of exactly as described.

For simplicity and clarity of the illustration(s), elements in the figures are not necessarily to scale, some of the elements may be exaggerated for illustrative purposes, and the same reference numbers in different figures denote the same elements, unless stated otherwise. Cross hatched regions or cross-hatching in the drawings is used merely to assist in distinguishing boundaries of different regions and does not imply any type of materials. Additionally, descriptions and details of well-known steps and elements may be omitted for simplicity of the description. Neither the figures nor the Detailed Description are intended to limit the scope as claimed. Instead, they merely represent examples of different implementations.

Reference to "one embodiment" or "an embodiment" or an "implementation" means that a particular feature, structure, or characteristic described in connection with the embodiment or implementation is included in at least one implementation. Thus, appearances of the phrases "in one implementation" or "in an implementation" in various places throughout this specification are not necessarily all referring to the same implementation, but in some cases it may. Furthermore, the particular features, structures or characteristics may be combined in any suitable manner and in a wide variety of different implementations, as would be apparent to one of ordinary skill in the art, in one or more implementations.

The embodiments or implementations illustrated and described hereinafter may have implementations and/or may be practiced in the absence of any element which is not specifically disclosed herein.

The terms "IC, integrated circuit, monolithically integrated circuit" include at least a single semiconductor die which may be delivered as a bare die or as a packaged circuit. For the purposes of this document, the term integrated circuit also includes packaged circuits that may include multiple semiconductor dies, stacked dies, or multiple-die substrates. Such constructions are now common in the industry, produced by the same supply chains, and for the average user often indistinguishable from monolithic circuits.

DETAILED DESCRIPTION

The present description describes extending dataflow graphs across multiple processors of a system. Also included are flow control circuits and methods that assist in reducing congestion or deadlocks on a network.

In one implementation, a circuit may be configured to implement a lossless protocol to implement lossless connectivity within a system. An implementation of the circuit may be configured to repeatedly transmit frames within the system even though the circuit received a pause command from a network. The circuit may be configured to periodically transmit at least one packet of data of one or more transaction type(s) while the pause command is active.

The subject matter described in this description can be implemented to realize one or more of the following advantages:

First, using an Ethernet shim (E-Shim) for communications over a network to/from a CGRP facilitates using standard Ethernet switches in the network.

Second, configuring an E-Shim to periodically transmit frames during a pause operation facilitates reducing congestion on a network.

Third, configuring an E-Shim to periodically transmit frames during a pause operation assists in clearing data that is stored in nearly full buffers within the E-Shim and assists in more rapidly creating space for other data in the buffers.

Fourth, configuring an E-Shim to assist in flow control on the network allows a host processor to change the rate of transmissions which allows for fine tuning of the load presented to the network.

Fifth, the E-Shim flow control assists in minimizing deadlock conditions on the network.

FIG. 1 is a block diagram illustrating portions of an example of a coarse-grained reconfigurable (CGR) architecture (CGRA) system 100 for extending dataflow graphs across multiple processors of system 100. CGRA system 100 includes a host 101, a number of course grained reconfigurable processors (CGRPs) 110 (111-116), an interconnection network 105 and communication links 130 (131-137) that connect the host 101 and the CGRPs 110 to the interconnection network 105. Host 101 may be, or may include, a computer such as further described with reference to FIG. 11. Host 101 runs runtime processes, as further referenced herein, and may also be used to run computer programs, such as a compiler. In some implementations, the compiler may run on a computer that is similar to the computer described with reference to FIG. 11, but separate from host 101. CGRA system 100 may also include memory 120 respectively coupled to the CGRPs 110. Memory 120 can be any type of memory, including dynamic data rate (DDR) dynamic random access memory (DRAM), including MEM-A 121 coupled to CGRP-A 111, MEM-B 122 coupled to CGRP-B 112, MEM-C 123 coupled to CGRP-C 113, MEM-D 124 coupled to CGRP-D 114, MEM-E 125 coupled to CGRP-E 115, and MEM-F 126 coupled to CGRP-F 116. Other implementations may include other types of memory in place of, or in addition to, the DDR DRAM, such as high-bandwidth memory (HBM), static memory, or flash memory.

Communication links 130 can be any type of communication link, parallel or serial, electrical or optical, but in some implementations, each may be one or more physical Ethernet links. The Ethernet links may be compliant with any version of the Ethernet specification. Interconnection network 105 may have any type of topology depending on the system design and particular embodiment. In some implementations, interconnection network 105 may be implemented as direct links between pairs of devices where each device is one of CGRP 111-116 or host 101. For example, the host may have six individual links that respectively directly connect to the six CGRPs 111-116 and each CGRP may, in addition to its link connecting to host 101, may have a link to each of the other CGRPs 111-116. For example, CGRP-A 111 may have a first link connecting directly to the host 101, a second link connecting directly to CGRP-B 112, a third link connecting directly to CGRP-C 113, a fourth link connecting directly to CGRP-D 114, a fifth link connecting directly to CGRP-E 115, and a sixth link connecting directly to CGRP-F 116; thus, link 131 may include six individual links. In other embodiments, interconnection network 105 may include a bus structure, a switching fabric, or one or more switches and/or routers, that are able to route a transaction from an originating CGRP 110 or host 101 to a destination CGRP 110 or host 101. A transaction is an activity used to provide information to or between elements on network or a bus.

Each of CGRPs 110 may include a grid of compute units and memory units interconnected with an internal switching array fabric. CGRPs 110 can be configured by downloading configuration files from host 101 to configure the CGRPs 110 to execute one or more graphs 140 that define dataflow computations, and can implement any type of functionality including, but not limited to, neural networks. Communication links 130 and interconnect network 105 provide a high degree of connectivity that can increase the dataflow bandwidth between the CGRPs 110 and enable the CGRPs 110 to cooperatively process large volumes of data via the dataflow operations specified in the execution graphs 141-144.

A set of graphs 141-144 can be assigned to the CGRA system 100 for execution. The graphs 141-144 are overlaid on the block diagram of the CGRA system 100 showing how they may be assigned to the CGRPs 110. In the example shown, graph1 141 is assigned to CGRP-A 111 and CGRP-D 114, graph2 142 is assigned to CGRP-B 112 and sections of CGRP-C 113, graph3 143 is assigned to sections of CGRP-C 113, CGRP-F 116, and sections of CGRP-E 115, while graph4 144 is assigned to sections of CGRP-E 115. While the set of graphs 141-144 is statically depicted, one of skill in the art will appreciate that the execution graphs are likely not synchronous (i.e., of the same duration) and that the partitioning within a CGR computing environment will likely be dynamic as execution graphs are completed and replaced.

As can be understood from FIG. 1, nodes of a graph may be distributed across multiple CGRPs. Nodes of a graph within a CGRP may communicate using internal communication paths of the CGRP, but communication between nodes of a single graph in different CGRPs may use Ethernet communication over links 130 and interconnection network 105.

FIG. 1 shows example graph1 141 spread across multiple CGRPs with CGRP-A 111 configured to execute a first node of the graph1 141, and another CGRP-D 114 configured to execute a second node of the same graph1 141. The first node of graph1 141 may send data to the second node of graph1 141. A connected processor of host 101, such as processor 1220 further described with reference to FIG. 11, may be used to move the data from the first node to the second node.

As mentioned above, host 101 may configure the CGRPs 110 by downloading configuration bit files to the CGRPs 110. This may be accomplished by sending the configuration bit files over the communication links 130 and interconnection network 105. The configuration bit files can include information to configure individual units within CGRPs 110 as well as the internal communication paths between those units. The configuration bit files may be static for the duration of execution of a graph and configure a portion of one of CGRPs 111-116 (or the entire CGRP) to execute one or more nodes of an execution graph 141-144.

Figure 2:
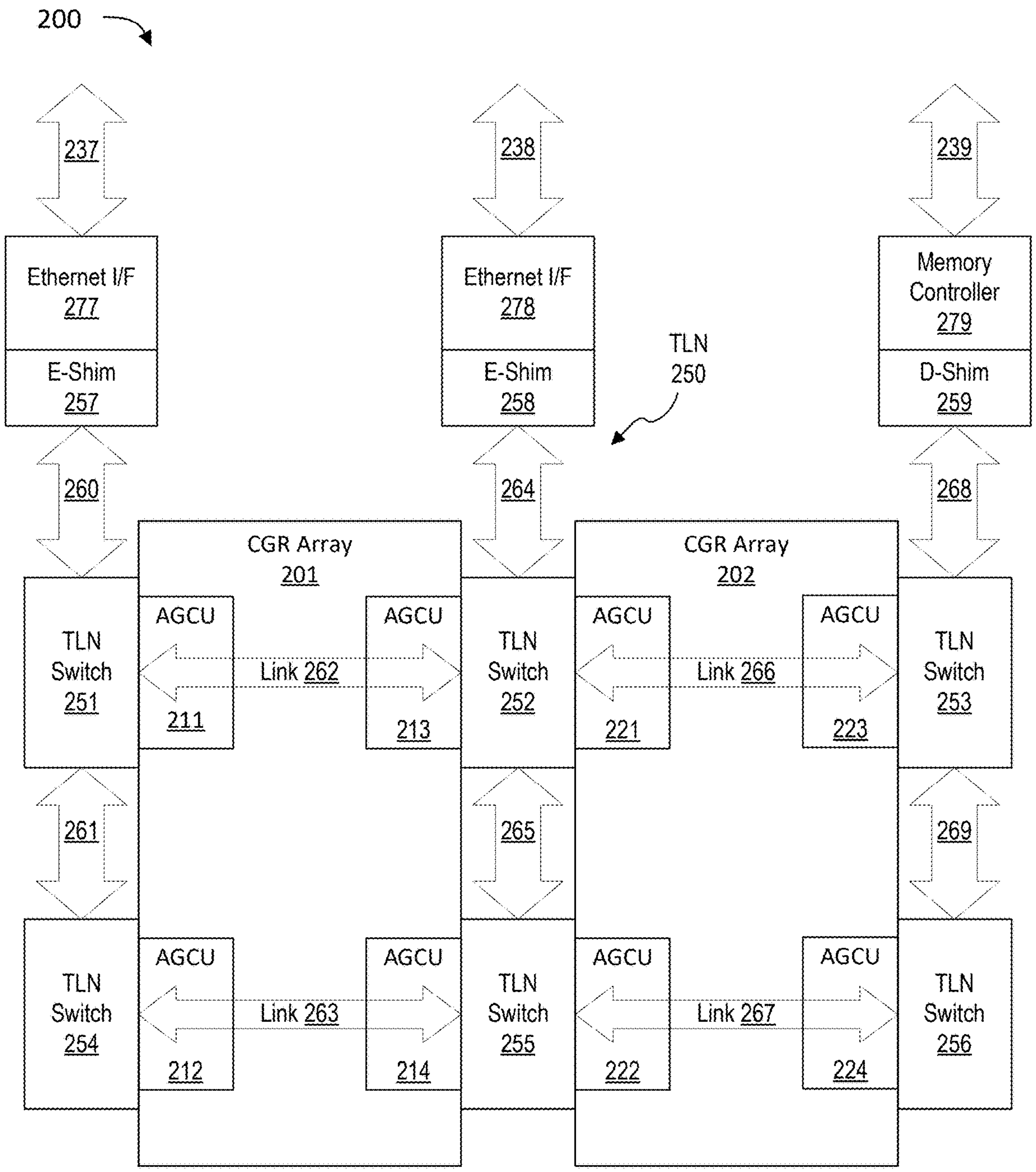
FIG. 2 is a simplified block diagram illustrating an example CGR processor (CGRP) having a CGRA, according to an implementation of the present disclosure.

FIG. 2 is a simplified block diagram of an example of a CGRP 200 having a CGRA, according to an implementation, which may be used as CGRP 111-116 in the CGRA system 100 of FIG. 1. In this example, CGRP 200 has 2 CGR arrays (CGR array 201, CGR array 202), although other implementations can have any number of CGR arrays, including a single CGR array. Each CGR array 201, 202 (which is shown in more detail in FIG. 3) comprises an array of configurable units connected by an array-level network (ALN) in this example. Each of the two CGR arrays 201 and 202 has one or more address generation and coalescing units (AGCUs) 211-214, 221-224. AGCUs are nodes on both a top-level network (TLN) 250 and on ALNs within their respective CGR arrays 201, 202 and include resources for routing data among nodes on the TLN 250 and nodes on the ALN in each CGR array 201, 202.

CGR arrays 201-202 are coupled to TLN 250 that includes TLN switches 251-256 and links 260-269 that allow for communication between elements of CGR array 201, elements of CGR array 202, and shims to other functions of the CGRP 200 including Ethernet shims (E-Shims) 257, 258 and a double data rate (DDR) memory shim (D-Shim) 259. Other functions of CGRP 200 may connect to the TLN 250 in different implementations, such as additional shims to additional and or different input/output (I/O) interfaces and memory controllers, and other chip logic such as control/status registers (CSRs), configuration controllers, or other functions. Data travel in packets between the devices (including TLN switches 251-256) on links 260-269 of TLN 250. For example, TLN switches 251 and 252 are connected by a link 262, TLN switches 251 and E-Shim 257 are connected by a link 260, TLN switches 251 and 254 are connected by a link 261, and TLN switch 253 and D-Shim 259 are connected by a link 268.

TLN 250 is a packet-switched mesh network with four independent networks operating in parallel; a request network, a data network, a response network, and a credit network. While FIG. 2 shows a specific set of switches and links, various implementations may have different numbers and arrangements of switches and links. All four networks (request, data, response, and credit) follow the same protocol. The only difference between the four networks is the size and format of their payload packets.

E-Shims 257, 258 provide an interface between TLN 250 and Ethernet Interfaces 277, 278 which connect to external communication links 237, 238 which may form part of communication links 130 as shown in FIG. 1. While two E-Shims 257, 258 with Ethernet interfaces 277, 278 and associated Ethernet links 237, 238 are shown, implementations can have any number of E-Shims and associated Ethernet interfaces and links. A D-Shim 259 provides an interface to a memory controller 279, which has a DDR interface 239 and can connect to memory such as the memory 120 of FIG. 1. While only one D-Shim 259 is shown, implementations can have any number of D-Shims and associated memory controllers and memory interfaces. E-Shims 257-259 and associated interfaces include resources for routing data among nodes on the top-level network (TLN) 250 and external devices, such as high-capacity memory, host processors, other CGRA processors, FPGA devices and so on, that are coupled to E-Shims 257-258 and D-Shim 259 through external links 237-239.

Figure 3:
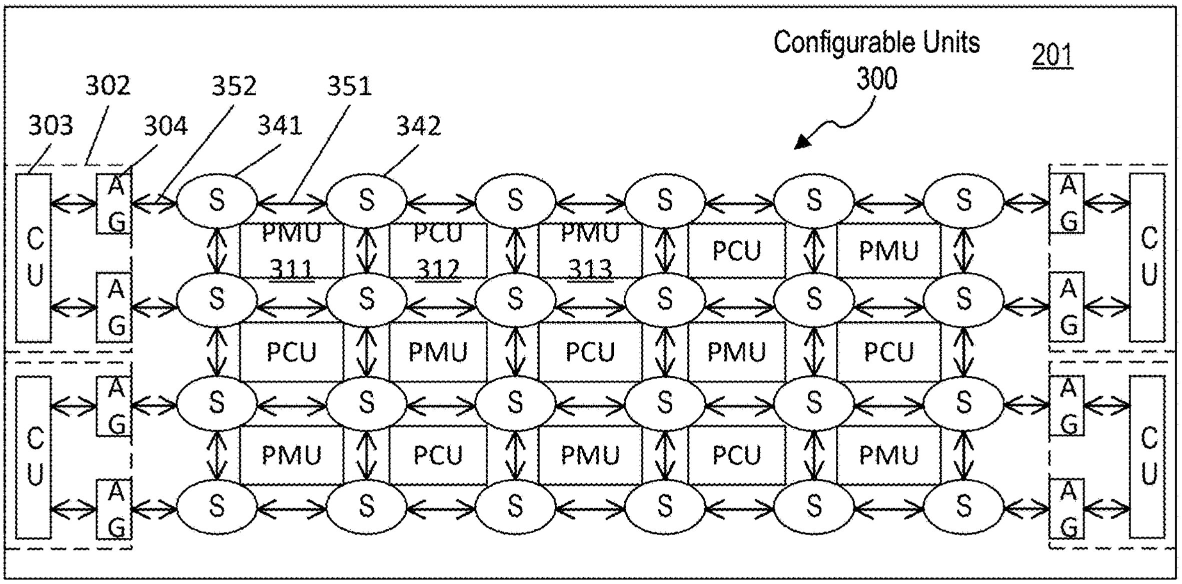
FIG. 3 is a simplified block diagram illustrating an example CGR array of an CGRP, according to an implementation of the present disclosure.

FIG. 3 is a simplified diagram of CGR array 201 (which may, in some implementations, be similar to CGR array 202) of FIG. 2, where the configurable units 300 in the array 201 are nodes on the array-level network. In this example, the array of configurable units 300 includes a plurality of types of configurable units. The types of configurable units in this example include Pattern Compute Units (PCU) such as PCU 312, Pattern Memory Units (PMU) such as PMUs 311, 313, switch units(S) such as Switches 341, 342, and Address Generation and Coalescing Units (AGCU) such as AGCU 302. Other implementations may include other types of configurable units such as other types of compute units, other types of memory units, and/or fused compute and memory units (FCMUs). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which has been incorporated by reference into this disclosure.

Each of these configurable units includes a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces. Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units by a configuration load/unload controller in an AGCU 302 based on the contents of the bit file to allow all the components to execute a program (i.e., a graph). Program Load may also load data into a PMU memory.

The array-level network includes one or more links interconnecting configurable units 300 in the array 201. For example, the links in the array-level network may include three kinds of physical buses: a chunk-level vector bus (e.g. 128 bits of data), a word-level scalar bus (e.g. 32 bits of data), and a multiple bit-level control bus. For instance, interconnect 351 between switches 341 and 342 includes a vector bus interconnect with vector bus width of 128 bits, a scalar bus interconnect with a scalar bus width of 32 bits, and a control bus interconnect.

During execution of a machine after configuration, data can be sent via one or more unit switches and one or more links between the unit switches to the configurable units using the vector bus and vector interface(s) of the one or more switch units on the array-level network.

As shown in FIG. 1, there are cases where a configurable unit on one CGRP may need to send or receive data controlled by another CGRP. A lossless protocol provides a way to accomplish this communication. The lossless protocol provides lossless network connectivity for dataflow applications over Ethernet in the event of data loss over a layer 2 (L2) network. The lossless protocol may be implemented by an E-Shim which may be configured to implement lossless connectivity on a per-stream basis, where a stream is a connection between a source CGRP E-Shim and a destination CGRP E-Shim. Each stream may carry Ethernet frames which may encapsulate direct memory access (EDMA) or peer-to-peer (P2P) traffic, i.e. transactions. A P2P protocol may be defined to include several primitive operations including a remote write, a remote read request, a remote read completion, a stream write, and a stream clear-to-send (SCTS). The P2P primitive operations can be used to create more complex P2P transactions that utilize one or more P2P primitive operations. The complex transactions may include a remote store, a remote scatter write, a remote read, a remote gather read, a stream write to a remote PMU, a stream write to remote DRAM, a host write, a host read, and/or a barrier operation. EDMA traffic includes user space direct memory access (DMA) operations initiated by a DMA engine internal to a CGRP to move data between a source CGRP memory and either a destination CGRP memory or a host memory.

In various peer-to-peer (P2P) transactions, an initiating CGRP, which may be referred to as a source, requester, initiator, or producer CGRP depending on the type of transaction, may initiate various types of transactions to various resources in a remote CGRP (which may be referred to as a target, destination, or consumer CGRP) and in some cases may receive various responses from the target CGRP. In general, a P2P transaction is initiated by a configurable unit in a CGR array of the initiating CGRP which sends a request for the transaction to an AGCU that has been linked to the configurable unit for a graph by the compiler and/or runtime software by loading a configuration bit file into the CGRP. The AGCU generates a TLN transaction to an E-Shim on the initiating CGRP by generating a TLN destination address to identify the E-Shim in the initiating CGRP to use for the TLN transaction. The TLN transaction payload may include a header, one or more of a transaction identifier, a target CGRP ID, a target TLN device ID, a physical address, data, and/or other metadata, such as the amount of data to be included in the transaction.

The initiating E-Shim may use the target CGRP ID to generate an address, such as for example a MAC address, for the target CGRP ID on an external communications network using a lookup table, such as for example a stream table. The address may also include, among other things, an ID of the initiating CGRP, initiating E-Shim, and/or initiating AGCU so that the target CGRP can send a response, if required, back to the initiating AGCU. The initiating E-Shim then communicates through a communications interface to the external communications network to a communications interface on a remote CGRP.

The P2P protocol defines a payload that can be sent as a packet of a different protocol to another device, such as an Ethernet protocol packet. Although other protocols could be used for transferring the P2P payload, such as, but not limited to, PCIe or InfiniBand. A source CGRP can create the payload for the P2P primitive operation. The P2P payload may include one or more of a primitive operation identifier, an ID for the source CGRP, an ID for the source ACGU, an ID of the target CGRP, an ID of a target ACGU, a size of the data transfer, an address for the data in remote memory, and/or the data being transferred, depending on which primitive operation is being used. Various units within both the source CGRP and the destination CGRP are configured using configuration bit files to perform the various tasks of the P2P operations. The P2P protocol, primitives, and complex transactions are described in a related U.S. patent application Ser. No. 18/218,562, published as US 2024/0020261, entitled "Peer-To-Peer Route Through In A Reconfigurable Computing System," and U.S. patent application Ser. No. 18/383,718, published as US 2024/0073 129, entitled "Peer-To-Peer communication between Reconfigurable Dataflow Units," both of which have been incorporated by reference into this disclosure.

FIGS. 4A, 4B, 4C, and 4D illustrate examples of a lossless Ethernet Framer (LEF) header 402, a LEF payload 404, an EDMA/P2P packet 406, and an Ethernet frame 408, according to an implementation. Other implementations may include somewhat different information in the LEF header 402, LEF payload 404, or EDMA/P2P packet 406, to implement a lossless protocol within the scope of this disclosure.

Figure 4A:
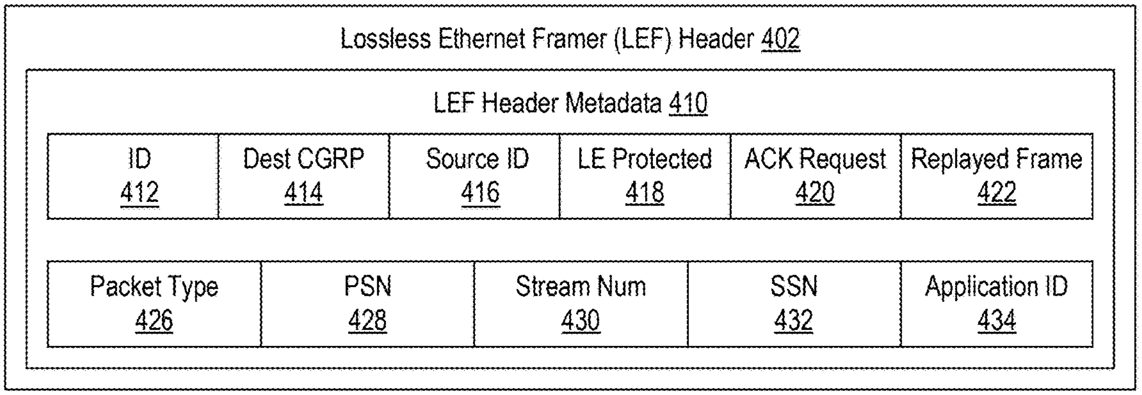
FIGS. 4A, 4B, 4C, and 4D illustrate examples of a lossless Ethernet Framer (LEF) header, a LEF payload, an EDMA/P2P packet, and an Ethernet frame, according to an implementation of the present disclosure.

As shown in FIG. 4A, the illustrated lossless Ethernet Framer (LEF) header 402 may comprise an ID 412, a destination CGRP 414, a source ID 416, a lossless Ethernet (LE) protected indicator 418, an acknowledgement (ACK) request indicator 420, a replayed frame indicator 422, a packet type 426, a packet sequence number (PSN) 428, a stream number 430, a stream sequence number (SSN) 432, and an application ID 434. Packet type 426 may also include information that identifies a NACK indicator.

ID 412 may be a specific identifier to mark this Ethernet frame as using the lossless protocol and that the destination can interpret the following bits as a LEF header 402. LE protected indicator 418 indicates whether this specific Ethernet frame is within a stream that is protected by a lossless Ethernet protocol. ACK Request indicator 420 indicates that the current Ethernet frame requires an ACK back from a destination CGRP. Replayed frame indicator 422 indicates that the current Ethernet frame is a re-transmission Ethernet frame in response to a dropped Ethernet frame. It may be set by the source CGRP when re-transmitting an Ethernet frame due to a previous negative acknowledgement (NACK) event.

The packet type 426 identifies the type of packet, such as, a start stream packet, a P2P packet, an EDMA packet, an ACK packet, or a negative acknowledgement (NACK) packet. PSN 428 is a tag for each packet that is sequentially incremented for each Ethernet frame of a protected stream. PSN 428 may have a value of zero for each Ethernet frame of a non-protected stream. Source CGRP may set PSN 428 of every Ethernet frame that is to be transmitted. Stream number 430 may identify which of the active streams on the source CGRP includes this Ethernet frame.

SSN 432 may be associated with a stream and may remain constant throughout the lifetime of the associated stream. An SSN for each stream assigned based on a starting SSN that may be initialized to a value of zero and then sequentially incremented whenever a new stream is assigned its SSN. The SSN 432 may be used to differentiate packets belonging to different PSN sequences which may be using the same stream related hardware. The SSN 432 might not be used for Ethernet frames of a non-protected stream.

Application ID 434 identifies the application associated with the Ethernet frame. The application identified by the application ID 434 may be a dataflow graph that may be configured onto at least the source CGRP and the destination CGRP, and is to be executed on these CGRPs.

Figure 4B:
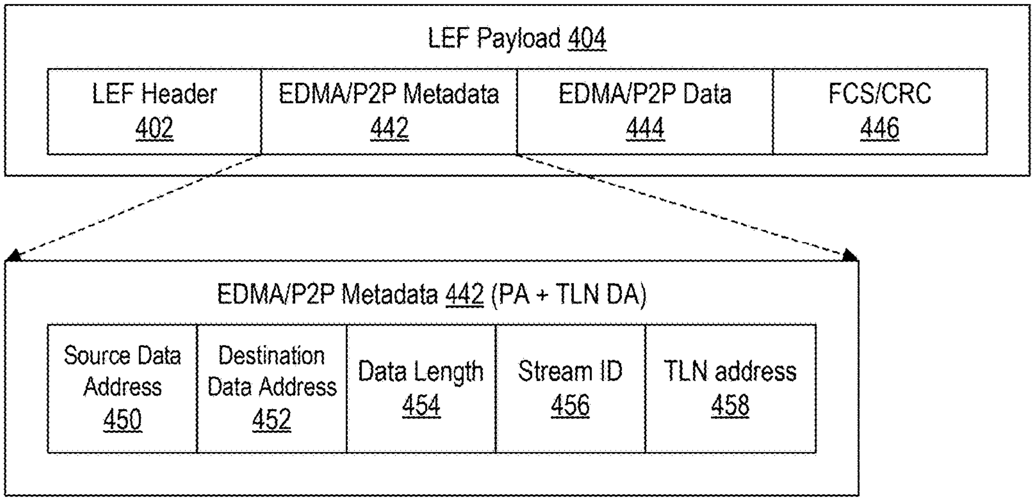

As shown in FIG. 4B, the illustrated LEF payload 404 may comprise LEF header 402, EDMA/P2P metadata 442, EDMA/P2P data 444, and a frame check sequence (FCS) including a cyclic redundancy check (CRC), FCS/CRC 446, which may be used to detect any in-transit corruption of data. EDMA/P2P metadata 442 may provide additional information related to the underlying transaction being carried by LEF payload 404 and may, for example, comprise a source data address 450, a destination data address 452, a data length 454, a stream ID 456, and a TLN address 458 which identifies a particular agent on the TLN of the destination CGRP.

Figure 4C:
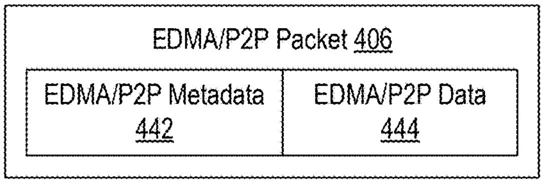

As shown in FIG. 4C, EDMA/P2P packet 406 may comprise EDMA/P2P, metadata 442 and EDMA/P2P data 444.

Figure 4D:
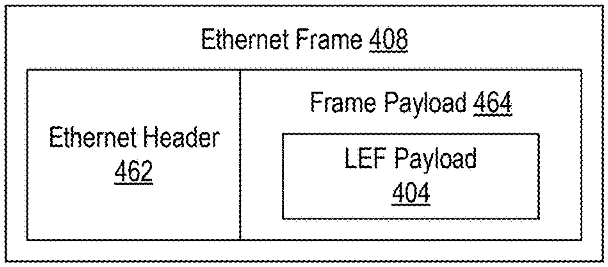

As shown in FIG. 4D, Ethernet frame 408 may comprise an Ethernet header 462 and a frame payload 464. The frame payload 464 may include an EDMA/P2P payload such as within LEF payload 404. The Ethernet header may identify which type of Ethernet frame is being used, such as a Layer 2 (L2) frame, an internet protocol (IP)/user datagram protocol (UDP) frame, a virtual extensible LAN (VxLAN) frame (with or without 802.1Q tagging), or a multiprotocol label switching (MPLS) frame.

During operation, the source CGRP may include a LEF header 402 in each Ethernet frame to be transmitted to the destination CGRP. In addition, the EDMA/P2P traffic may be saved in a replay buffer as a possible replay source in the event of dropped traffic. Each buffered EDMA/P2P packet may be tracked using the stream number and the PSN.

On the transmit side, stream number 430 may be used to determine which buffer location incoming EDMA/P2P packets 406 are copied into. On the receiving side, stream number 430 along with source ID 416 may be used to determine checks against correct PSN sequencing for that Stream.

Figure 5:
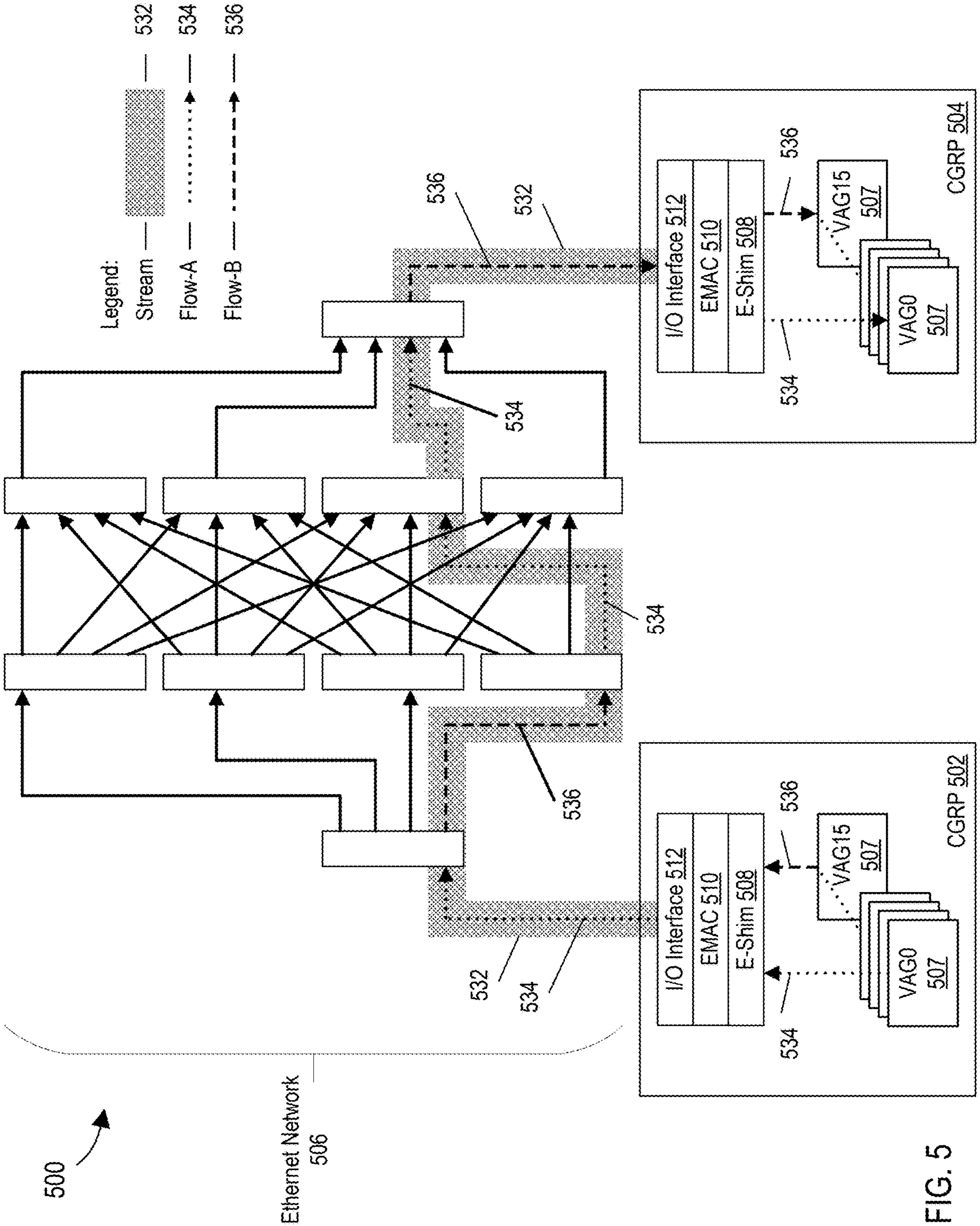
FIG. 5 is a block diagram illustrating an example CGRA system including a communication stream having flows from one CGRP to another CGRP over an Ethernet network, according to an implementation of the present disclosure.

FIG. 5 is a block diagram illustrating an example system 500 including a communication stream having two flows from one CGRP to another CGRP over an Ethernet network, according to an implementation. System 500 includes CGRPs 502 and 504, and an Ethernet network 506. CGRPs 502 and 504 include E-Shim 508, EMAC 510, I/O interface 512, and Virtual Address Generators (VAGs) 507 including VAG0 to VAG15 that are located within an AGCU of the CGRPs 502 and 504.

A flow, as the term is used herein, is a set of transactions from one particular source in the source CGRP 502 to another particular destination on the destination CGRP 504. The order of the transactions within flows 534 and 536 are preserved and are delivered in order. As an example, flows 534 and 536 may include EDMA Transactions comprising a sequence of transactions transferring data from a memory device (not shown) coupled to CGRP 502 by EDMA 510 to a memory device (not shown) coupled to CGRP 504. As another example, flows 534 and 536 may include P2P transactions comprising a first flow 534 including a sequence of streaming writes (SWRITEs) from CGRP 502 to CGRP 504, and a second flow 536 including a sequence of SCTSs from CGRP 502 to CGRP 504. The first flow 534 and the second flow 536 are different flows, not the same flow, within a stream 532.

Stream 532 can be an aggregation and encapsulation of flows from I/O interface 512 of CGRP 502, to another I/O interface 512 of CGRP 504. Stream 532 may encapsulate several elements, such as for example a traffic class for the stream, a source CGRP, a source MAC address, a destination CGRP ID, a destination MAC address, and hardware elements on the transmitting and receiving CGRPs 502 and 504, respectively. The order of transactions within stream 532 may be preserved. However, there is no ordering maintained between transactions of different streams.

Example stream 532 includes multiple flows including flows 534 and 536, although in some cases a stream may include only a single flow. The transactions within stream 532 delivered from the source CGRP 502 over Ethernet network 506 to the destination CGRP 504 in order. Ethernet network 506 may be configured to preserve the order of the transactions within stream 532. This can be accomplished by using separate Ethernet links between each pair of I/O interfaces 512 of CGRPs or by using switches and/or routers in the network 506 that are configured to route Ethernet frames in the same way as long as they have identical Ethernet headers. Further, the engine implementing stream 532 and its mechanisms may be configured to satisfy various network requirements so that the Ethernet network 506 preserves the order of the transactions.

As will be seen further hereinafter, an E-Shim, such as for example E-Shim 508 or other E-Shims, may implement a lossless protocol that may provide lossless network connectivity for dataflow applications over an Ethernet network. The Ethernet network may have an implementation that may be similar to networks 105 or links 130 (FIG. 1), or network 506 (FIG. 5). Additionally, as will be seen further hereinafter, the E-Shim may further support flow control of the network using Ethernet Pause or Ethernet PFC frames.

Figure 6:
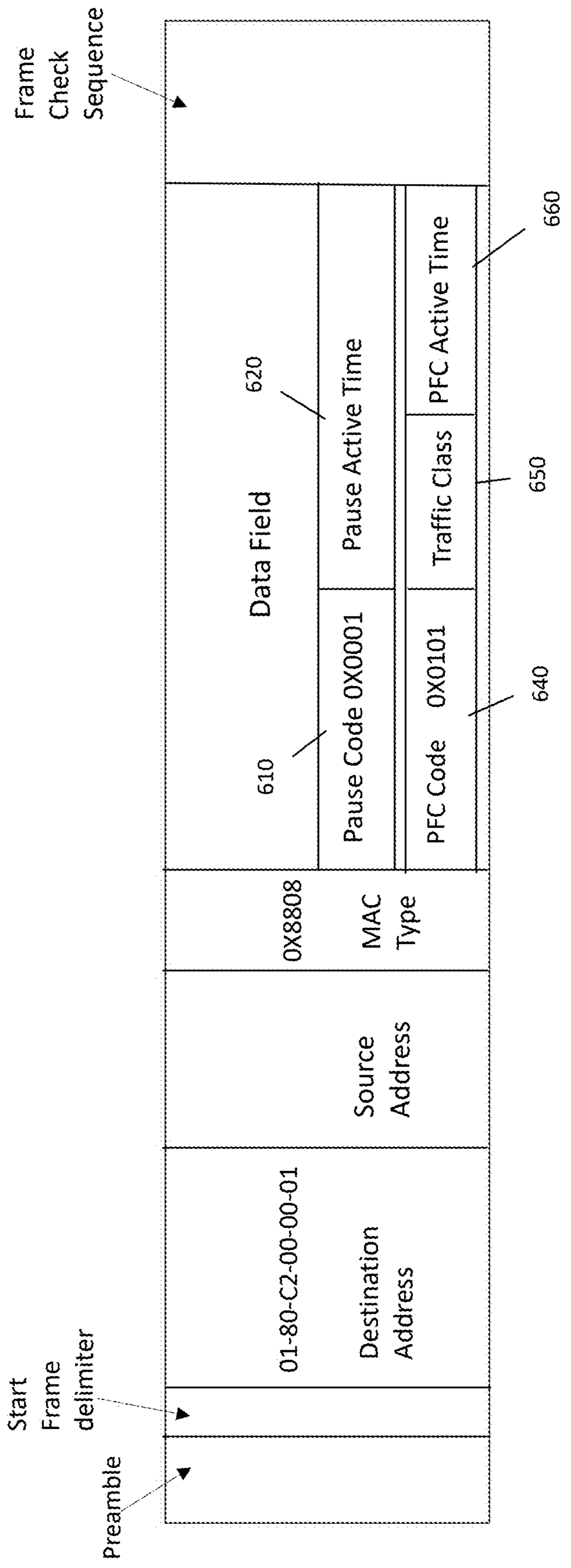
FIG. 6 illustrates in a general manner some of the fields that may be in some versions of a frame for an Ethernet Pause command and an Ethernet PFC command, according to an implementation of the present disclosure.

FIG. 6 illustrates in a general manner some of the fields that may be in some versions of a frame for an Ethernet Pause command and an Ethernet PFC command. An Ethernet PFC command includes an op code field 640 that when set to 0x0101 identifies the command as an Ethernet PFC command and includes a Traffic class field 650 that specifies traffic classes that are to be paused. Traffic class field 650 is usually an eight bit field that specifies one or more of the eight IEEE 802.1Q traffic classes to be paused. An Ethernet Pause command includes an op code field 610 that when set to 0x0001 identifies the command as an Ethernet Pause command, however, the Ethernet Pause command does not include traffic class field 650 or associated information. The Ethernet Pause command and the Ethernet PFC command include respective active time fields 620 and 660 that indicate a time that the pause command is active. The various different specifications for the Ethernet Pause and PFC commands may include other fields and information in addition to the fields illustrated in FIG. 6.

Figure 7:
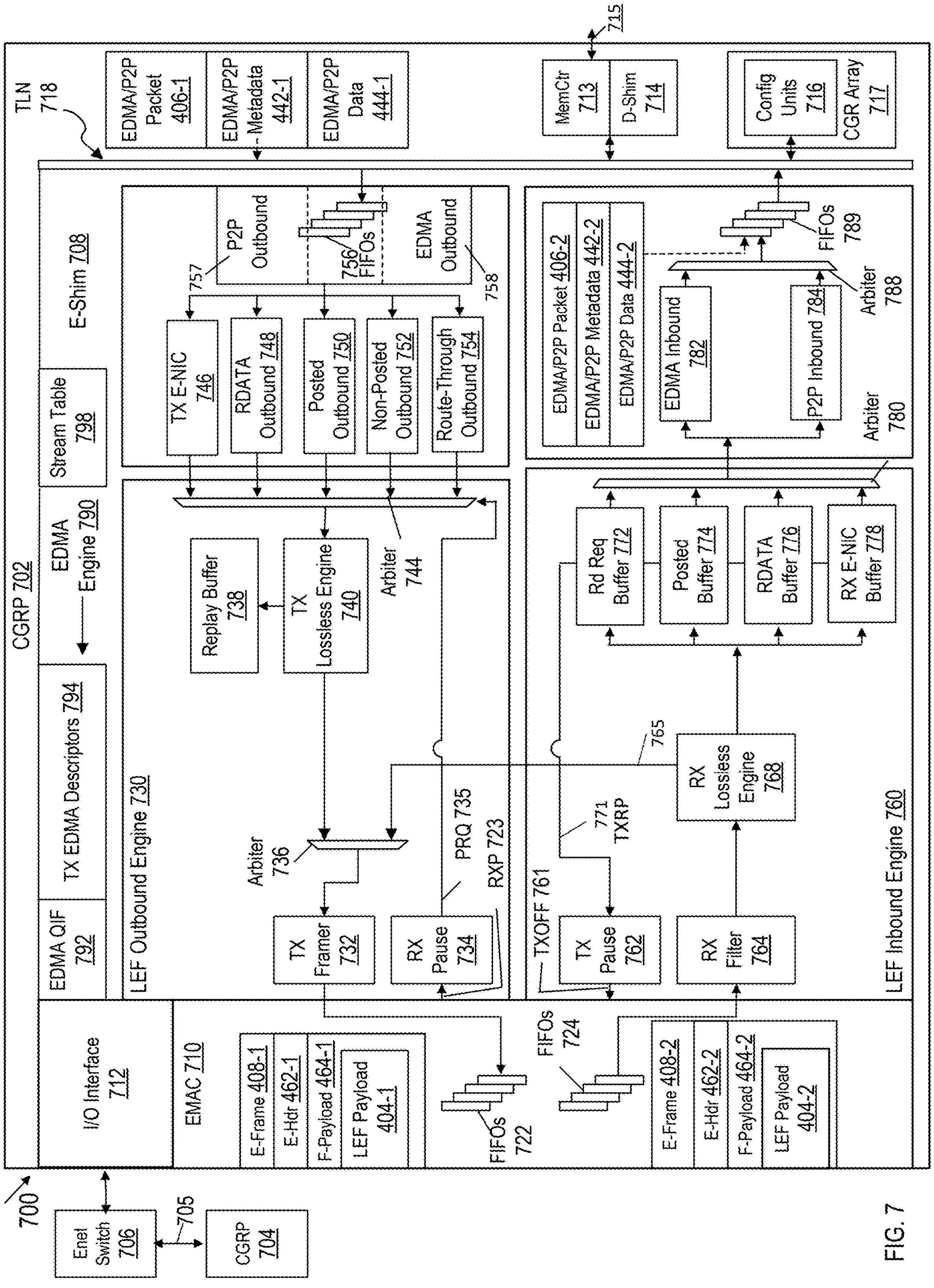
FIG. 7 is a block diagram illustrating an example CGRA system for extending dataflow graphs across multiple processors of a system, according to an implementation of the present disclosure.

FIG. 7 is a block diagram illustrating an example CGRA system 700 including a schematic illustration of an example of a portion of an implementation of an E-Shim 708. E-Shim 708 may have an implementation that is similar to any one of E-Shims 257-258 (FIG. 2) or 508 (FIG. 5). CGRA system 700 includes, but is not limited to, CGRPs 702 and 704, and an Ethernet Switch 706 which may be a part of an Ethernet network. In some implementations, CGRP 704 may be configured with substantially the same internal configuration(s) as CGRP 702. CGRP 702 includes E-Shim 708, an I/O interface (or Ethernet Phy) 712 that may implement the physical layer of the Ethernet protocol, an Ethernet media access controller (EMAC) 710, a TLN 718, a D-Shim 714, a memory controller 713, and a CGR array 717 including configurable units 716. EMAC 710 includes asynchronous outbound FIFOs 722 and asynchronous inbound FIFOs 724. TLN 718, D-Shim 714, memory controller 713, and CGR array 717 including configurable units 716 may be structurally and functionally similar to TLN 250, D-Shim 259, memory controller 279, and CGR array 201 including configurable units 300, previously described with reference to FIGS. 2 and 3. For example, memory controller 713 may be coupled to an external memory through a memory interface link 715, such as for example DDR interface 239 shown in FIG. 2, that can connect to memory such as the memory 120 of FIG. 1.

In one or more implementations, E-Shim 708 may implement a lossless protocol that may provide lossless network connectivity for dataflow applications over an Ethernet network such as for example an Ethernet network 705. Network 705 may have an implementation that may be similar to networks 105 or 506 (FIG. 5), or links 130 (FIG. 1). E-Shim 708 may further support flow control of the network using Ethernet Pause or Ethernet PFC frames.

E-Shim 708 includes an inbound pipeline, an outbound pipeline, a stream table 798, and an EDMA engine 790. EDMA engine 790 may include queue interface (QIF) 792, transmit (TX) EDMA descriptors 794, and receive (RX) EDMA descriptors 796. The outbound pipeline includes a lossless Ethernet framer (LEF) outbound circuit or LEF outbound engine 730, TX Ethernet network interface controller (E-NIC) buffer 746, a circuit for a read data (RDATA) outbound buffer 748, a circuit for an outbound posted request buffer 750, a circuit for an outbound non-posted request buffer 752, a circuit for a route-through outbound buffer 754, P2P outbound engine 757, and an EDMA outbound engine 758. P2P inbound engine 757 and EDMA outbound engine 758 may share or alternately may include asynchronous outbound first-in-first-out (FIFO) buffers or FIFOs 756. The inbound pipeline includes a LEF inbound circuit or LEF inbound engine 760, an EDMA inbound engine 782, a P2P inbound engine 784, an arbiter 788, and asynchronous inbound FIFOs 789. In some implementations, the function of arbiter 788 may be provided by an arbiter for TLN 718. Other implementations may have different organizations of circuitry within the E-Shim 708. An implementation of E-Shim 708 may include portions of or all of EMAC 710.

Runtime software (not shown in FIG. 7) may populate stream table 798 with stream table entries. The information to be populated into stream table 798 may be stored in local memory of a CGRP, such as CGRP 702 or 704, or in a memory in the host 101 that is accessible by the CGRPs 702 and 704. Each stream table entry in stream table 798 may be associated with a single lossless stream, and may include the traffic class information associated with the single lossless stream. The single lossless stream may have an associated stream identifier (ID), which may be used as an index into stream table 798 to access the stream table entry for this lossless stream. An implementation may allow multiple flows and transaction types to map to the same stream table entry. Mapping multiple flows to the same lossless stream reduces the amount of hardware required for E-Shim 708.

LEF outbound engine 730 includes a TX framer circuit or TX framer 732, an RX pause circuit or RX pause 734, an arbiter circuit or arbiter 736, a replay buffer 738, a TX lossless circuit or lossless engine 740, and an arbiter circuit or arbiter 744.

LEF inbound engine 760 includes a TX pause circuit or TX pause 762, an RX filter 764, an RX lossless engine 768, inbound buffers 772-778 including a read request buffer 772, a posted buffer 774, an RDATA buffer 776, and an RX E-NIC buffer 778. LEF inbound engine 760 also includes an arbiter 780.

E-Shim 708 may use I/O interface 712 to transmit and receive Ethernet frames between multiple CGRPs including CGRPs 702 and 704, over Ethernet network 705. An Ethernet frame is a data link layer protocol data unit and uses the underlying physical layer transport mechanisms. Thus, E-Shim 708 may support different types of Ethernet frames including, but not limited to, layer 2 (L2) frames, user datagram protocol (UDP) frames, internet protocol (IP)/UDP frames, virtual Extensible LAN (VxLAN) frames, multiprotocol label switching (MPLS) frames, and other types of Ethernet frames. One or more of the frame types may include Ethernet network interface controller (E-NIC) frames.

In some implementations, the EMAC 710 may provide multiple Ethernet channels. Thus, E-Shim 708 also interfaces with one or more channels provided by EMAC 710 when operating in different modes. For example, in some implementations, E-Shim 708 may interface with one EMAC channel when operating in 800G mode and two EMAC channels when operating in 2×400G mode. In other implementations, E-Shim 708 may interface with any number of EMAC channels when operating in one or more different modes of operation.

EMAC 710 may pass Ethernet frames of Ethernet network 705 through I/O interface 712 under control of a user application, such as a dataflow graph configured onto at least CGRPs 702 and 704, through an E-Shim, for example E-Shim 708. For example, I/O interface 712 may provide Ethernet connectivity for CGRP 702 to access CGRP 704. In other embodiments, I/O interface 712 may provide Ethernet connectivity to more than one CGRP over Ethernet network 705. The asynchronous FIFOs of EMAC 710 including outbound FIFOs 722 and inbound FIFOs 724 may interface with E-Shim 708.

E-Shim 708 may perform various functions, such as for example acting as an interface between the Ethernet network and TLN 18. Communication between one or more CGRPs using P2P protocol is described in related U.S. patent application Ser. No. 18/383,718, published as US 2024/0073129, entitled "Peer-To-Peer communication between Reconfigurable Dataflow Units," which has been incorporated by reference into this disclosure. In that application, a P-Shim is described which acts as an interface between the TLN and a Peripheral Component Interconnect Express (PCIe). The P2P Outbound Engine 757 and the P2P Inbound Engine 784 in E-Shim 708 may include much of the same functionality to enable P2P transactions to flow between CGRPs except that the transactions are encapsulated in Ethernet frames instead of PCIe transaction level packets.

E-Shim 708 may receive outgoing data from TLN 718 that is destined to another node such as a node on Ethernet network 705. For example, E-Shim 708 may receive outgoing EDMA or P2P packets 406-1, which may include EDMA or P2P Metadata 442-1 and EDMA or P2P Data 444-1, over TLN 718 through outbound buffers or FIFOs 756, which may be destined for CGRP 704, or one or more other CGRPs. E-Shim 708 may encapsulate the EDMA or P2P packets 406-1 into Ethernet frames 408-1 based on the type of packets received and provide them to EMAC 710 for transport over Ethernet network 705. For example, the P2P packets may come from a configurable unit of the configurable units 716 in CGR array 717. E-Shim 708 may generate outbound Ethernet frames 408-1 from the P2P packets and provide them to EMAC 710 for transport over Ethernet network 705.

E-Shim 708 may receive an EDMA or a P2P packet from TLN 718 and add the EDMA or P2P packet to outbound FIFOs 756. E-Shim 708 may de-queue the EDMA or P2P packet from the head entry of outbound FIFOs 756 and analyze the packet to determine an E-Shim transaction type for the packet. E-Shim 708 may classify the received packet as an E-Shim transaction type of a Posted Request transaction type, a Non-Posted Request transaction type, a Completions transaction type, a Route-Through transaction type, or an E-Nic transaction type. For example, P2P and EDMA outbound engines 757 and 758, respectively, may analyze the packet and place the EDMA or P2P packet into buffers according to the E-Shim transaction type including posted outbound buffer 750, non-posted outbound buffer 752, route-through outbound buffer 754, TX E-NIC buffer 746, or RDATA outbound buffer 748 based on information in packet 406-1 or based on a prior pending E-Shim operation, such as for example an EDMA operation, or other information. The corresponding outbound buffer may add packet 406-1 to its corresponding output FIFO.

The Posted Request transaction types that are placed into outbound posted request buffer 750 may include operations for P2P remote write (RWrite), P2P Stream Write (SWrite), P2P stream clear to send (SCTS), EDMA write, and EDMA write inline. The Non-Posted Request transaction types that are placed into outbound non-posted request buffer 752 may include operations for P2P remote read (RRead), and P2P remote Sync (RSync), and EDMA read. The Completion transaction types that are placed into read data (RDATA) outbound buffer 748 may include operations for P2P RRead data, and EDMA read data. Route Through transaction types are placed into route-through outbound buffer 754 and E-NIC transaction types are placed into the E-NIC buffer 746.

Arbiter 744 selects a next packet to send. For example, arbiter 744 may examine the head entry of each FIFO of buffers 746-754 and may arbitrate among output of the FIFOs with valid entries in a round-robin fashion to select a packet, and provide the selected packet to TX Lossless engine 740. In other implementations, arbiter 744 may arbitrate in other fashions.

TX Lossless Engine 740 generates a lossless ethernet framer (LEF) payload, such as for example a LEF Payload 404-1 (similar to that shown in FIG. 4B), using the packet selected by arbiter 744 from outbound buffers 746-754. TX lossless engine 740 stores LEF Payload 404-1 to the replay buffer 738, and presents it to arbiter 736 to be passed to TX framer 732. In some cases, such as for TX E-NIC packets, TX lossless engine 740 may be bypassed, and the packets may be presented directly to arbiter 736 to be passed to TX framer 732. Arbiter 736 may use any arbitration algorithm, including but not limited to a round-robin arbitration, to select among possible packets, including ACK/NACK packets and NACK packets, to send to TX framer 732 which generates an Ethernet frame 408-1. TX framer 732 may use information from stream table 798 to generate an Ethernet header 462-1 and encapsulate LEF payload 404-1, including the LEF header, metadata, and data, into an Ethernet frame payload 464-1. TX framer 732 may also place Ethernet frame 408-1 into FIFOs 722 so that EMAC 710 can send it through the I/O interface 712 over the Ethernet network. Payloads, such as for example payload 404-1, stored in replay buffer 738 can be accessed and re-sent later in case of an error or lost packet in the Ethernet network 705. TX Lossless engine 740 may also re-transmit dropped frames using corresponding payloads in replay buffer 738.

Arbiter 736 determines when to pass LEF payload 404-1 to TX framer 732 by arbitrating between TX Lossless Engine 740 and other packets to send over the Ethernet network 705 such as ACK frames or NACK frames, generated by the LEF Inbound Engine 760. TX framer 732 may generate an Ethernet frame 408-1 from the LEF payload created by TX lossless engine 740 and may provide the Ethernet frame 408-1, including the Ethernet Frame Payload 464-1 (which may just be the LEF payload 404-1) and the Ethernet Header 462-1, to EMAC 710 through the asynchronous FIFOs 722. E-NIC packets from the E-NIC outbound buffer 746 may bypass TX lossless engine 740 and TX framer 732. EMAC 710 may transmit the Ethernet frame 408-1 over the Ethernet physical layer using the I/O interface 712 to Ethernet network 705.

LEF outbound engine 730 may also process and frame packets from an outbound engine, such as EDMA outbound engine 790. LEF outbound engine 730 may need to determine these packet's Ethernet destination. When a new lossless stream is being processed, LEF outbound engine 730 may access stream table 798 using the destination stream ID of the packet as the index into stream table 798. The stream ID may be determined based on the TLN transaction payload, such as using a set of upper address bits of the destination address as the stream ID.

E-Shim 708 may also receive data from Ethernet network 705 that is destined for CGRP 702, such as, for example, D-Shim 714 or CGR Array 717. EMAC 710 may receive an inbound Ethernet frame 408-2 from the Ethernet network 705, including Ethernet Header 462-2 and Ethernet Payload 464-2, and may add Ethernet frame 408-2 to the inbound FIFOs 724. EMAC 710 may de-queue Ethernet frame 408-2 from the head entry of inbound FIFOs 724 and may provide Ethernet frame 408-2 to LEF inbound engine 760 of the E-Shim 708.

RX filter 764 compares Ethernet header 462 and a portion of the Ethernet payload 464-2, which may include the LEF header and the LEF metadata of LEF payload 404-2, against a set of one or more filters and can take one of several actions with the Ethernet frame 408-2 if it matches one of the filter criteria. The filters (including associated masks) as well as the action to take with the frame if it matches the filter, may be programmable by the host of CGRP system 700. The actions may include passing matching frames to an RX E-NIC buffer 778, passing matching frames to a RX Lossless Engine 768, passing matching frames to both RX E-NIC buffer 778 and the RX Lossless Engine 768, or dropping the matching frames.

Frames 408-2 that are not dropped may be deframed. For example, LEF payload 404-2 may be extracted from Ethernet Payload 464-2 and classified based on its E-Shim transaction type such as a Posted request, a Non-Posted read request, an E-NIC type transaction, or an RData type transaction. After classifying, LEF Payload 404-2 may be extracted and placed into inbound EDMA/P2P packets 406-2. EDMA/P2P packets 406-2 may include EDMA/P2P metadata 442-2 and EDMA/P2P data 444-2 provided in LEF payload 404-2 in Ethernet frame 408-2. EDMA/P2P packets 406-2 may be provided to RX lossless engine 768 which checks LEF payload 404-2 for errors using information in LEF Header 402-2 and generates requests to arbiter 736 in LEF outbound engine 730 to send ACKs and/or NACKs as necessary for the LEF. RX lossless engine 768 then places EDMA/P2P packets 406-2 into the per-transaction type receive buffers 772-778 based on their transaction type. The per-transaction type receive buffers may include read request buffer 772, Posted buffer 774, RData buffer 776, and RX E-NIC buffer 778. Non-Posted read request buffer 772 holds P2P RRead, P2P RSync, and EDMA read requests. Posted buffer 774 holds P2P RWrites, P2P SWrites, P2P SCTS, EDMA write, and EDMA write inline. RDATA buffer 776 holds P2P and EDMA read data completions, and the RX E-NIC buffer 778 holds E-NIC packets. The per-transaction type receive buffers 772-778 may be implemented as one or more FIFOs.

Arbiter 780 may arbitrate between the various receive buffers 772-778 in round-robin fashion and may read data from the head of the selected receive buffer and may decode the EDMA/P2P packets 406-2, including their metadata 442-2 and data 444-4, and provide them to the corresponding EDMA inbound engine 782 or P2P inbound engine 784 based on the packet type or E-Shim transaction type of the decoded EDMA/P2P packets 406-2. The selected one may transfer the corresponding EDMA/P2P packets 406-2 to TLN 718 through asynchronous FIFOs 789. E-Shim 708 may transmit the EDMA/P2P packets to TLN 718 from inbound FIFOs 789.

EDMA inbound engine 782 and P2P inbound engine 784 may each include read scoreboards to track the non-posted read requests that have been issued to the TLN 718. If any of the scorecards are full, then no new read requests can be processed. To avoid head of line blocking, arbiter 780 may not select a transaction from the non-posted buffer if the read scoreboards are full.

As will be seen further hereinafter, E-Shim 708 is configured to selectively perform a Metered pause operation or Metered pause to assist in providing flow control of the E-Shim transaction types in response to receiving a pause command. The received pause command may be an Ethernet Pause command or an Ethernet PFC command or other type of pause command. The Ethernet Pause command or Ethernet PFC command may be as defined by various Ethernet specifications including various versions of the IEEE 802.1 and 802.3 specifications including IEEE 802.1Q. The pause request or command may have other definitions or other formats in other implementations. An implementation of E-Shim 708 may be configured to perform the Metered pause by reducing a transmission rate of at least one E-Shim transaction type for the duration of the received pause command. Alternately, E-Shim 708 may be configured to periodically transmit at least one frame having a packet of data to a destination node even though the received pause command is active. For example, during some operations, E-Shim 708 may be transmitting frames to the Ethernet network faster than can be processed by a destination Ethernet node, such as for example CGRP 704 or switch 706. The destination Ethernet node may send a pause request or pause command to E-Shim 708 to request a pause in transmissions.

To facilitate the flow control provided by the Metered pause, E-Shim 708 may include circuits that may have metering control information for managing the Metered pause. The metering control information may include one field of control information for each E-Shim transaction type that may be transmitted by E-Shim 708. For example, if there are six transactions types then there are six fields of the metering control information. Each field of the metering control (MC) information may include any number of bits that define certain functions to be implemented if certain of the bit(s) are asserted. The number of bits may be the same for each field or may be different for one or more of the fields, thus, some fields may have fewer bits than one or more other fields.

Each field of the MC information has a format that defines the functions of the MC information as follows:

- Traffic class identifies 802.1Q traffic class(es) that correspond to an E-Shim transaction type,
- Metered enable identifies if a Metered pause is performed during a pause command for the E-Shim transaction type that is identified by the Traffic class information,
- Time interval identifies a time interval or delay between the two sequential transmissions of the E-Shim transaction type that is identified by the Traffic class information.

The Traffic class information identifies which of the 802.1Q Traffic classes correspond to this E-Shim transaction type. The Metered enable information identifies if this E-Shim transaction type (that is associated to the Traffic class) is enabled for the Metered pause. The Time interval information specifies the time interval between two transmissions of the transaction type identified by the Traffic class. The Time interval information may be a value that defines a number of cycles of a known time interval between sending two consecutive packets of this E-Shim transaction type. For example, the value may represent a number of cycles of an internal clock of E-Shim 708, or a value of multiple cycles of some other internal clock, a number of microseconds or milliseconds in real time, or any other desired time interval.

Figure 8:
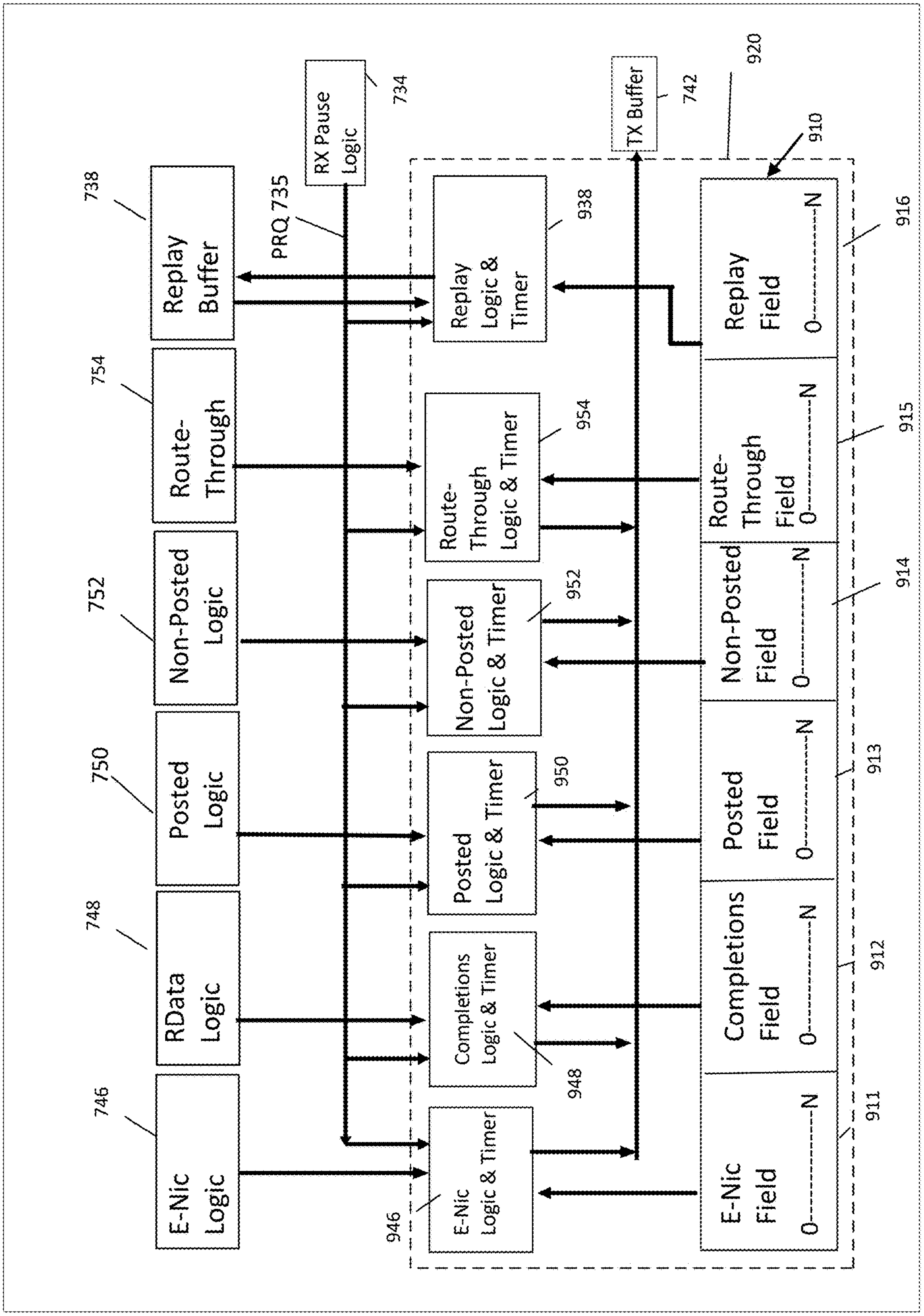
FIG. 8 illustrates in a general manner a block diagram illustration of an example of an implementation of portions of an RX Pause control register (CSR) and an associated flow control circuit that may be configured to facilitate flow control.

FIG. 8 illustrates in a general manner a block diagram illustration of an example of an implementation of portions of an RX Pause control register (CSR) 910 and associated flow control circuit or controller 920 (illustrated in a general manner by a dashed box) that may be configured to facilitate the Metered pause. An implementation of E-Shim 708 may include circuits similar to controller 920 or may include other circuits or other implementations that assist to facilitate the Metered pause. An example implementation of CSR 910 may be configured to hold the metering control (MC) information. CSR 910 may include registers 911, 912, 913, 914, 915, and 916 such that one register corresponds to one E-Shim transaction type that may be transmitted by E-Shim 708. Each of registers 911, 912, 913, 914, 915, and 916 may include any number of bits of the metering control information. An implementation of controller 920 may include logic and control circuits that selectively allow or inhibit E-Shim 708 from providing data to be transmitted to the destination node. The fields of the metering control information may be originally stored/written into CSR 910, or alternately E-Shim 708, and subsequently changed/updated by the runtime processes or software of Host 101. Controller 920 may also have an implementation that may include logic and control circuits 938, 946, 948, 950, 952, and 954. Circuits 938, 946, 948, 950, 952, and 954 may include counters and metering timers in addition to logic and control circuits. In other implementations, controller 920 may include other circuits, such as for example portions of RX pause 734 and buffers 746, 748, 750, 752, and 754 and/or portions of buffer 738. CSR 910 and/or controller 920 may be a portion of LEF Outbound circuit 730 and in some implementations may be included within arbiter 744 (FIG. 7) or anywhere within E-Shim 708 circuitry or even elsewhere in CGRP 702. Other implementations of E-Shim 708 may have other logic circuits, instead of CSR 910 and controller 920, that may be configured to facilitate the Metered pause for E-Shim 708.

The metering control information in registers 911-916 may be used to assist in controlling the operation of circuits 938, 946, 948, 950, 952, and 954 during the time that a pause command is active. The logic and circuits of control circuits 938, 946, 948, 950, 952, and 954, including the corresponding timing circuits, may be configured to load the respective Time interval information from the respective register 911-916 into the respective one of control circuits 938, 946, 948, 950, 952, and 954 so that the timing circuits may form the time interval or time period specified by the Time interval of the field.

Figure 9:
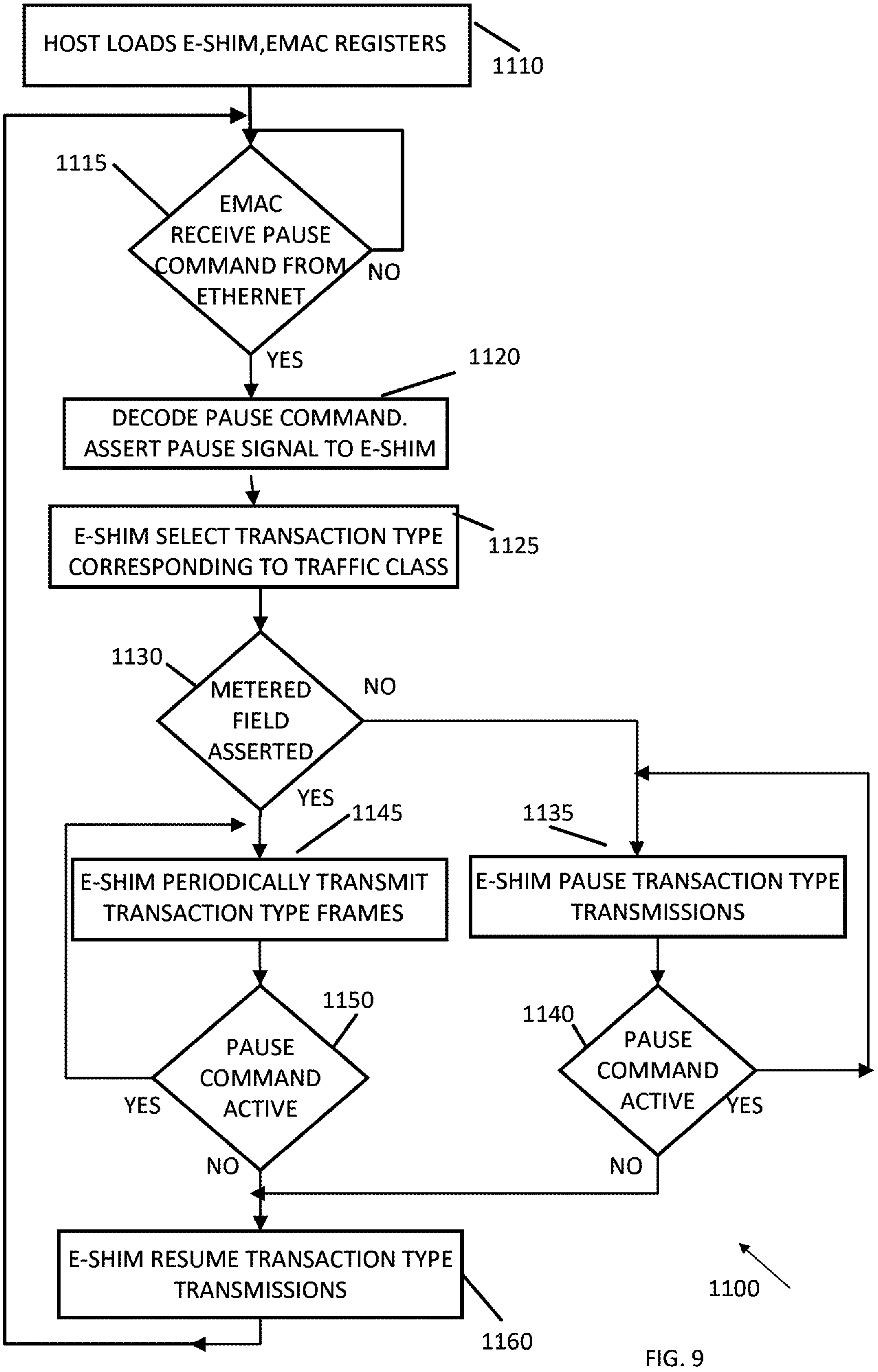
FIG. 9 is a flowchart illustrating an example of a method for implementing flow control, according to an implementation of the present disclosure.

FIG. 9 is a flowchart 1100 illustrating in a general manner an implementation of an example of some operations of the Metered pause for E-Shim 708.

Referring to FIGS. 7-9, during operation, EMAC 710 is configured to decode an incoming frame that includes a pause request or pause command, and selectively pass control information to E-Shim 708 and Outbound circuit 730. For example, flowchart 1100 illustrates at 1110 that a host, such as host 101 (FIG. 1) may load the metering control information into E-Shim 708 or alternately into the registers of CSR 910. At 1115 EMAC 710 may operate as previously described until receiving a pause command from Ethernet network 705. In response to receiving the pause command, such as an Ethernet Pause command or an Ethernet PFC command, E-Shim 708 is configured to perform the Metered pause, such as for example selectively delay transmitting data of at least one E-Shim transaction type, or alternately selectively pause transmitting data of at least one E-Shim transaction type for the Time interval, or alternately selectively reduce the transmission rate of at least one E-Shim transaction type for the duration of the pause command. For example, E-Shim 708 may be configured to periodically transmit at least one frame of the transaction type to the destination node even though the pause command is active. For example, periodically transmit even though an Ethernet Pause command or an Ethernet PFC command is active.

If a pause command is received, EMAC 710 may decode the command and send a signal to E-Shim 708 indicating that the command is received. For example, EMAC 710 may assert an RX Pause (RXP) signal 723 which is received by RX pause 734. Flowchart 1100 illustrates at 1120 that EMAC 710 may decode the pause command and send a signal, such as for example signal 723, to E-Shim 708. RXP signal 723 may be a single signal line or may have multiple/N number of signal paths or lines/connections. EMAC 710 asserts RXP signal 723 to identify to E-Shim 708 the type of pause command that is received. If the received pause command is an Ethernet Pause command or an Ethernet PFC command, RXP signal 723 identifies the command and also identifies the desired traffic class that is to be paused if such is included in the received pause command. If an Ethernet PFC command is received, EMAC 710 decodes op code field 640 (FIG. 6) and traffic class field 650 (FIG. 6) and asserts signal 723 to identify receiving an Ethernet PFC command and identify the traffic class that is to be paused. If an Ethernet Pause command is received, EMAC 710 decodes op code field 610 (FIG. 6) and asserts signal 723 to identify receiving an Ethernet Pause command. Signal 723 may indicate that some or all traffic classes are to be paused. Alternately, EMAC 710 may use a particular traffic class to identify an Ethernet Pause command. For example, an implementation may use 802.1Q traffic class zero to identify an Ethernet Pause command. Other 802.1Q traffic classes may be used to identify the Ethernet Pause command in other implementations.

RX Pause 734 receives RXP signal 723 and forms a Pause Request (PRQ) signal 735 identifying that the pause command is received and also identifies the received traffic class if such is included in the received pause command. Signal 735 may be a single signal line or may have multiple/N number of signal paths or lines/connections. Outbound circuit 730, such as for example controller 920, receives PRQ signal 735 and provides flow control for frames being transmitted out of E-Shim 708. For the Metered pause operation, the flow control logic is configured to be selectively enabled to periodically send a frame having data from one of the outbound buffers to the destination node even if the pause command remains active. The transmission rate during the Metered pause is less than the normal rate for traffic on the Ethernet link. The transmission rate during the Metered pause may be one-half or one-fourth or some other fraction of the normal rate. The metering control information, including the Time interval, may be programable by the runtime processes or software and may be separately programmable for each transaction type. For example, the runtime software executed by Host 101 illustrated in FIG. 1 may be able to change the metering control information including the Time interval. This advantageously allows for fine tuning of the bandwidth available for the load provided by each E-Shim transaction type. Even though the Ethernet specification calls for no frames to be transmitted during an Ethernet Pause command or no frames of a particular traffic class during an Ethernet PFC command, E-Shim 708 continues to transmit frames at the rate specified by the Time interval of the metering control information. It has been found that the operation of the Metered pause, for example selectively transmitting frames of selected E-Shim transaction types at a lower rate during the active time of a pause command, advantageously minimizes network stall conditions, minimizes deadlock conditions, and minimizes starvation conditions; and may also reduce the amount of circuits within E-Shim 708 which also reduces the cost thereof.

When a PFC pause command is received, the flow control logic of E-Shim 708, such as for example controller 920, compares the information of PRQ signal 735 to the metering control information. For example, the information in registers 911, 912, 913, 914, 915, and 916. Flowchart 1100 illustrates at 1125 that E-Shim 708 may select the E-Shim transaction type corresponding to the Ethernet traffic class. If the desired traffic class received in PRQ signal 735 matches the traffic class stored in the Traffic class of the metering control information and if the Metered enable is asserted, as illustrated at 1130, transmission of the corresponding E-Shim transaction type is paused or inhibited for the Time interval. When the time specified in the Time interval expires, E-Shim 708 transmits another frame of data of the E-Shim transaction type and again pauses for the time stored in the Time interval. E-Shim 708 continues to repeat the sequence of pause for the Time interval and transmit a frame of the E-Shim transaction type as long as the pause command is active. Flowchart 1100 illustrates at 1145 and 1150 that E-Shim 708 may periodically transmit a frame of the selected transaction type as long as the pause command is active. Thus, E-Shim 708 is configured to periodically transmit data of the specified E-Shim transaction type at the interval specified by the Time interval while the pause command is active.

However, in response to receiving an Ethernet PFC command with the Traffic class of the field matching the desired traffic class specified by PRQ signal 735 but if the Metered enable is negated, E-Shim transmission of the transaction type that correspond to the Traffic class are paused as long as the pause command is active. Flowchart 1100 illustrates at 1135 and 1140 that E-Shim 708 may pause transmissions of the selected transaction type as long as the pause command is active. For example, the logic and circuits of control circuits 938, 946, 948, 950, 952, and 954 may be configured to prevent reading information from the respective buffers, such as the buffers of corresponding buffers 738, 746, 748, 750, 752 and 754, and to negate the corresponding outgoing signals to Lossless Engine 740 and/or Replay Buffer 738. Once the pause command is no longer active, E-Shim 708 may resume normal transmission activity, for example as illustrated by flowchart 1100 at 1160.

If an Ethernet Pause command is received instead of an Ethernet PFC command, EMAC 710 decodes the Ethernet Pause command and asserts signal 723 indicating the Pause command is received. RX Pause 734 asserts PRQ signal 735 indicating the Ethernet Pause command. According to an implementation, EMAC 710 may assert a traffic class of zero to indicate receiving an Ethernet Pause command. Other implementations may use a different traffic class to process or alternately to detect the Ethernet Pause command. E-Shim 708, or alternately controller 920, may compare the received traffic class with the metering control information for all transaction types. For example, controller 920 may compare signal 735 to the information in of CSR 910. If the field of the metering control information for an E-Shim transaction type has a Traffic class of zero with the Metered enable asserted, the corresponding E-Shim transaction type (s) become enabled for the Metered pause. Consequently, E-Shim 708, or alternately LEF Outbound circuit 730, periodically transmits data of the corresponding E-Shim transaction type(s) at the interval specified by the Time interval while the pause command is active. E-Shim 708 repeats the sequence of pause for the Time interval and transmit a frame of the corresponding E-Shim transaction type(s) as long as the pause command is active. However, if the Metered enable information is negated then E-Shim stops transmitting the E-Shim transaction types having a Traffic class of zero. Thus, E-Shim 708 may be configured to periodically transmit at least one frame of a selected transaction type having a packet of data to the destination node even though the pause command is active, including even though an Ethernet Pause command is active. For example, E-Shim 708 may continue to selectively transmit the corresponding E-Shim transaction type(s) but reduce the transmission rate thereof. Having multiple Time Intervals for different Transaction types facilitates providing different transmission rates for different Ethernet traffic classes. Using different Metering Rates for different traffic classes assists in minimizing deadlocks on the network.

However, if an Ethernet Pause command is received and if no field of the metering control information has a traffic class of zero then E-Shim 708 ignores the Ethernet pause command, irrespective of the state of any of the Meter enable information, and continues to transmit all E-Shim transaction types at the normal rate.

As is explained further hereinbefore, both the Ethernet Pause command and the Ethernet PFC command include respective active fields 620 and 660 (FIG. 6) that indicate an active time that the pause command is active. EMAC 710 asserts signal 723 as long as the pause command is active. EMAC 710 does not send the active time information to E-Shim 708 but simply maintains the RXP signal 723 for the duration of the active time. The active time in the Ethernet Pause and PFC commands generally is much greater than the time stored in the Time interval of the metering control information. The active time of the Ethernet Pause and PFC commands can be renewed or extended if the destination node sends another pause command before the active time of the current pause command expires. The Ethernet Pause command or PFC command may also become inactive by the destination node sending an Ethernet XOFF command to terminate the pause command. In response to receiving an XOFF command or alternately in response to the active time expiring, EMAC 710 negates RXP signal 723 and E-Shim 708 responsively resumes transmitting frames at the normal rate supported by the Ethernet network.

In some operating conditions E-Shim 708 may need to stop receiving data from the Ethernet network or alternately stop receiving data of some E-Shim transaction types. Inbound ethernet packets are de-framed within the Inbound pipeline logic or LEF inbound engine 760 and the inbound packets are placed into respective per-transaction type receive buffers in E-Shim 708, such as for example the Non-Posted buffer (such as Rd Req buffer 772), Posted buffer 774, RDATA buffer 776, and RX E-NIC buffer 778. In some operations, LEF Inbound Engine 760 may receive frames faster than can be processed. For example, a TLN switch in TLN network 718 may be stalled and not able to process frames from E-Shim 708. E-Shim 708 may be configured to request that incoming transactions from other nodes on the Ethernet network should paused or alternately be transmitted at a reduced rate/or period. For example, one or more of the per-transaction buffers, such as for example buffers 772, 774, 776, and 778, may be filled to a predetermined threshold. The respective buffer(s) may assert a transmit pause request signal (TXRP) 771 to Tx Pause circuit 762 indicating a request to pause some or all E-Shim transaction types. Tx Pause circuit 762 is configured to assert a TxOff signal 761 to EMAC 710 and EMAC 710 is configured to responsively send a pause command over Ethernet network 705. TxOff signal 761 and TXRP signal 771 may each be a single signal line or may have multiple/N number of signal paths or lines/connections. An alternate implementation may include that TXRP signal 771 may alternately be received by arbiter 736 as illustrated by a dashed line. LEF Inbound Engine 760 may be configured to generate a PAUSE/PFC frame and arbiter 736 may be configured to pass, in response to the asserted state of signal 771, the PAUSE/PFC frame to TX framer 732. TX framer 732 may provide the PAUSE/PFC frame, including the Ethernet Frame Payload and the Ethernet Header, to EMAC 710 through the asynchronous FIFOs 722. EMAC 710 may transmit the PAUSE/PFC frame over the Ethernet physical layer using the I/O interface 712 to Ethernet network 705.

Figure 10:
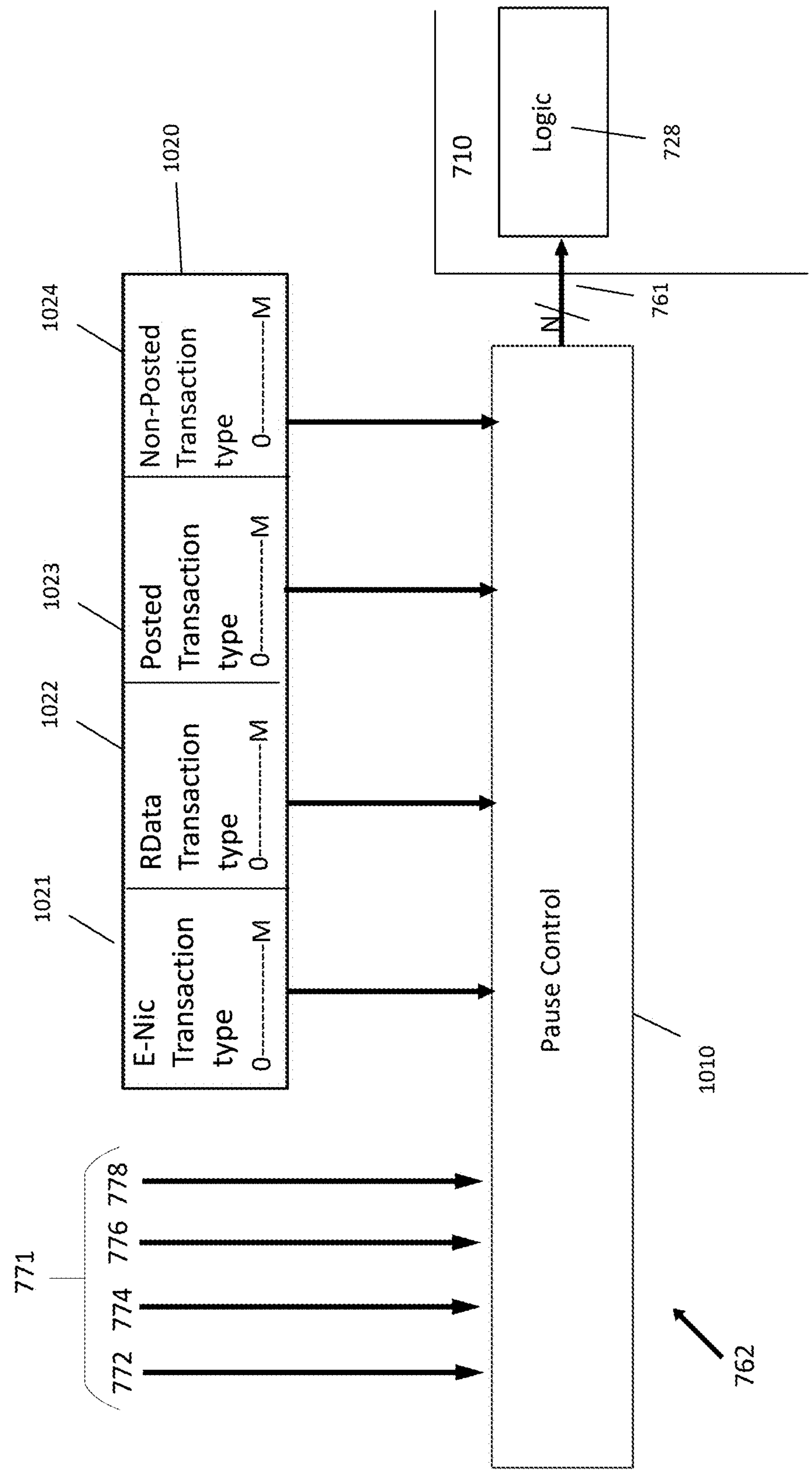
FIG. 10 schematically illustrates in a general manner a block diagram of an example of an implementation of a portion of Tx Pause circuit.

FIG. 10 schematically illustrates in a general manner a block diagram of an example of an alternate implementation of a portion of Tx Pause circuit 762. FIG. 10 also includes a block diagram illustration of a portion of EMAC 710. An implementation of Tx Pause circuit 762 may include control circuits or logic 1010 and a control register (CSR) 1020. Control register 1020 has a fields 1021, 1022, 1023, and 1024 that correspond to the E-Shim transaction type of respective buffers 772, 774, 776, and 778. Each field of CSR 1020 may include any number of bits that define certain functions to be implemented if certain bit(s) are asserted. Each field identifies 802.1Q traffic class(es) for a particular E-Shim transaction type that corresponds to the field.

Referring to FIGS. 7 and 10, E-Shim 708 may assert TXRP signal 771 to request a pause in data. TXRP signal 771 may have an implementation that identifies the E-Shim transaction type that needs to be paused. The logic of Tx Pause circuit 762 reads the 802.1Q traffic class from the field of CSR 1020 for the particular E-Shim Transaction type identified in signal 771. Tx Pause circuit 762 asserts TxOff signal 761 to identify the 802.1Q traffic class(es) read from CSR 1020. EMAC 710 is configured to receive the information in TxOff signal 761 and responsively generate an Ethernet Pause command or generate an Ethernet PFC command including the identified 802.1Q traffic class information. The Pause and PFC frames generated by EMAC 710 will indicate to the sender to temporarily stop or reduce the rate at which frames are being sent to EMAC 710.

EMAC 710 may include an internal control circuit or register 728 (FIG. 9) that controls if EMAC 710 generates an Ethernet Pause command or an Ethernet PFC command. Control register 728 stores information that specifies if the particular EMAC channel is to provide PFC Frames or Pause Frames in response to TxOff signal 761. The portion of internal control register 728 that stores the information may be programmed and/or changed by the runtime processes or software from Host 101 (FIG. 1).

Figure 11:
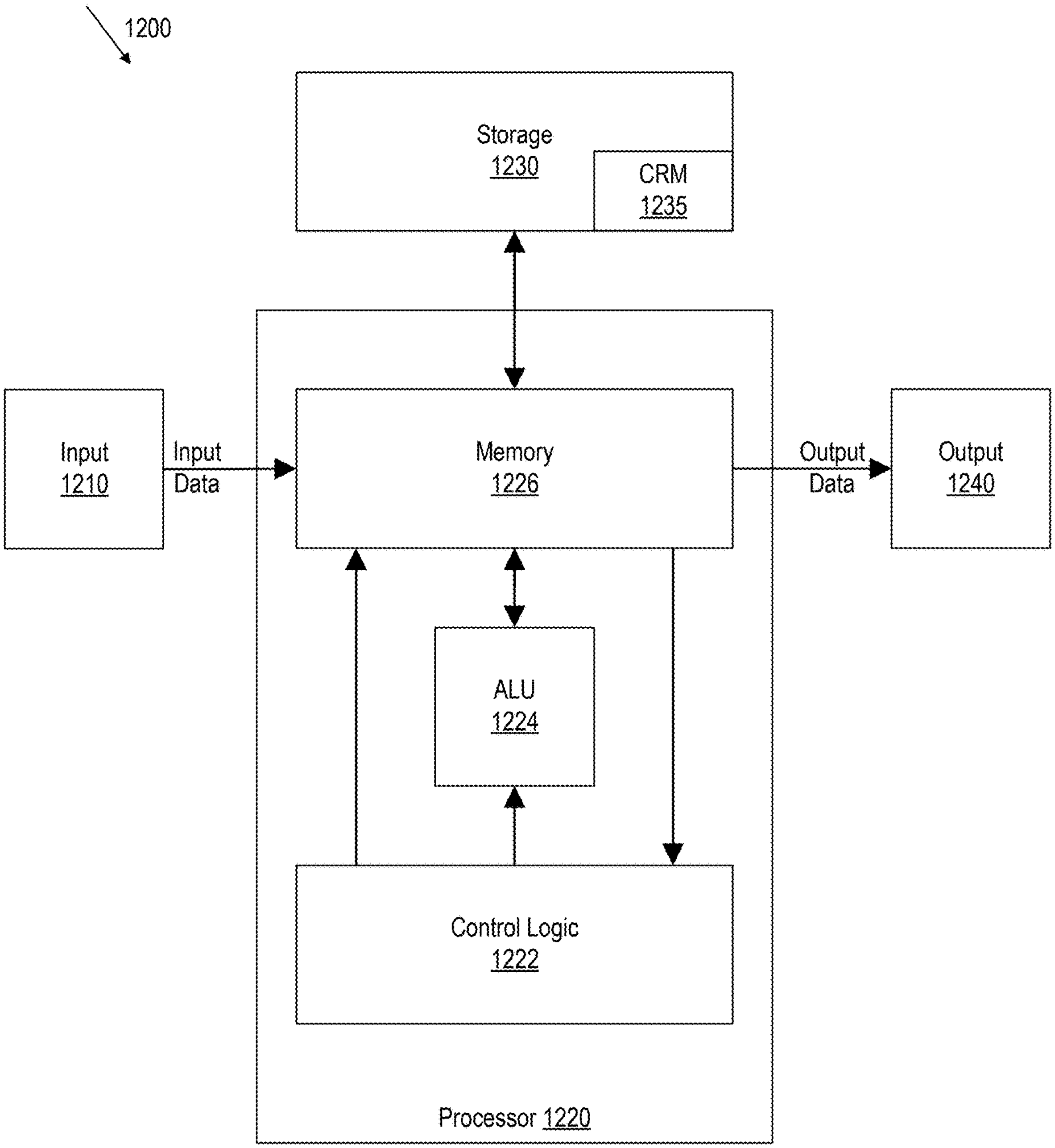
FIG. 11 illustrates an example of a computer, including an input device, a processor, a storage device, and an output device, according to an implementation of the present disclosure.

FIG. 11 illustrates an example of a computer 1200, including an input device 1210, a processor 1220, a storage device 1230, and an output device 1240, according to an implementation of the present disclosure. Although the example computer 1200 is drawn with a single processor, other implementations may have multiple processors. Input device 1210 may comprise a mouse, a keyboard, a sensor, an input port (for example, a universal serial bus (USB) port), and any other input device known in the art. Output device 1240 may comprise a monitor, printer, and any other output device known in the art. Furthermore, part or all of input device 1210 and output device 1240 may be combined in a network interface. Input device 1210 is coupled with processor 1220 to provide input data, which an implementation may store in memory 1226. Processor 1220 is coupled with output device 1240 to provide output data from memory 1226 to output device 1240. Processor 1220 further includes control logic 1222, operable to control memory 1226 and arithmetic and logic unit (ALU) 1224, and to receive program and configuration data from memory 1226. Control logic 1222 further controls exchange of data between memory 1226 and storage device 1230. Memory 1226 typically comprises memory with fast access, such as static random-access memory (SRAM), whereas storage device 1230 typically comprises memory with slow access, such as dynamic random-access memory (DRAM), flash memory, magnetic disks, optical disks, and any other memory type known in the art. At least a part of the memory in storage device 1230 includes a non-transitory computer-readable medium (CRM 1235), such as used for storing computer programs.

As can be seen from the foregoing, a system, such as for example system 700 or alternately CGRP 702, may have an implementation that may be configured to selectively pause transmitting Ethernet frames based on the Transaction type or alternately selectively use a Metering operation to transmit Ethernet frames based on the Transaction type.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

Particular Implementations

From all the foregoing, one skilled in the art will understand that a coarse-grained reconfigurable (CGR) processor (CGRP) may comprise: an array of CGR units including a first CGRU and a second CGRU; an internal network, such as for example TLN 718, coupled to the array of CGRUs; an external communication link, such as for example Ethernet 705, coupled to communicate with a first destination CGRP, such as for example CGRP 704, and a second destination CGRP, such as for example CGRP 702; an interface circuit, such as for example a circuit including E-Shim 708 and EMAC 710, coupled between the internal network and the external communication link, such as for example Ethernet 705, wherein the interface circuit includes a transmit circuit, such as for example a circuit including TX lossless 740 and replay 738 and TX framer 732, and one or more outbound buffers, such as for example buffers 746-756; the one or more outbound buffers configured to receive data from the internal network and store data as at least one of a plurality of transaction types wherein the data is destined for at least one of the first destination CGRP or the second destination CGRP; the transmit circuit configured to send communication streams having packets of the data from the one or more outbound buffers to at least one of the first destination CGRP or the second destination CGRP; a control circuit, such as for example a circuit that may include RX Pause 734 and CSR 610/620 or arbiter 744, of the interface circuit wherein the control circuit includes a control register the control register having control fields respectively corresponding to at least one transaction type of the plurality of transaction types for data in the one or more outbound buffers, and storing control information for the at least one transaction type, the control fields including a first control field for a first transaction type, the first control field having a first traffic class field, such as for example MC Traffic class, identifying a traffic class for the first transaction type, a first pause field, such as for example MC Metered enable, identifying a pause type for the first transaction type, and a first interval field, such as for example Time interval, identifying a first pause interval for the first transaction type; the interface circuit configured to receive over the external communication link an ethernet pause command, such as for example Ethernet Pause or PFC, to pause transmitting data of a desired traffic class, wherein the ethernet pause command originates from one of the first destination CGRP or the second destination CGRP; and the control circuit configured to pause transmitting data of the first transaction type for the first pause interval in response to the first control field having an asserted state stored in the first pause field and having the desired traffic class stored in the first traffic class field, the control circuit configured to transmit data of the first transaction type from the one of more outbound buffers after expiration of the first pause interval.

Another implementation may include that the ethernet pause command may be active for a time that is greater than the first pause interval.

Another implementation, compatible with any of the previous or following implementations, may include that the control fields may include a second control field for a second transaction type, the second control field having a second traffic class field, such as for example an MC Traffic class, identifying a traffic class for the second transaction type, a second pause field, such as for example an MC Metered enable, identifying a pause type for the second transaction type, and a second interval field, such as for example an MC Time interval, identifying a second pause interval for the second transaction type; and the control circuit configured to pause transmitting data of the second transaction type for the second pause interval in response to the second control field having an asserted state stored in the second pause field and having the desired traffic class stored in the second traffic class field, the control circuit configured to transmit data of the second transaction type from the one or more outbound buffers after expiration of the second pause interval.

An implementation, compatible with any of the previous or following implementations, may include that the control circuit may be configured to also transfer data of a third transaction type from the one or more outbound buffers.

An implementation, compatible with any of the previous or following implementations, may include that the control register may have a third control field corresponding to the third transaction type, the third control field having a third traffic class field wherein the desired traffic class is not stored in the third traffic class field.

Another implementation, compatible with any of the previous or following implementations, may include that the control circuit may be configured to delay for the first pause interval stored in the first interval field, then transfer a packet of data of the first transaction type from the one or more outbound buffers and then restart delaying for the first pause interval.

An implementation, compatible with any of the previous or following implementations, may include that the control circuit may be configured to repeat a sequence that includes delay for the first pause interval, transfer a packet of data from the one or more outbound buffers upon expiration of the first pause interval, and restart delaying the first pause interval.

Another implementation, compatible with any of the previous or following implementations, may include that the control circuit may be configured to repeat the sequence until the interface circuit receives a cancel command to cancel the ethernet pause command wherein the cancel command is an ethernet frame that originates from the one of the first destination CGRP or the second destination CGRP.

In another implementation, compatible with any of the previous or following implementations, the external communication link may be configured to use an ethernet protocol and the interface circuit is a portion of an ethernet shim, such as for example E-Shim 708.

An implementation, compatible with any of the previous or following implementations, may include that the ethernet pause command may be an ethernet control frame, such as for example an Ethernet Pause or PFC.

In implementation, compatible with any of the previous or following implementations, the ethernet control frame may be one of an ethernet PFC frame or an ethernet Pause frame.

An implementation, compatible with any of the previous or following implementations, may include that information defining the first pause interval may be stored into the control register by a runtime process, such as for example host 101, that is external to the CGRP.

Another implementation, compatible with any of the previous or following implementations, may include that the one or more outbound buffers may store data for more than one transaction type.

An implementation, compatible with any of the previous or following implementations, may include that the control circuit includes a plurality of timer circuits including a first timer circuit corresponding to the first transaction type and a second timer circuit corresponding to a second transaction type, wherein the first timer circuit inhibits transferring data for the first pause interval.

One skilled in the art will understand that a coarse-grained reconfigurable (CGR) processor (CGRP) may comprise coarse-grained reconfigurable (CGR) processor (CGRP) may comprise: an array of CGR units (CGRUs) including a first CGRU and a second CGRU; an internal network, such as for example TLN 718, coupled to the array of CGRUs; an external communication link, such as for example Ethernet 705, coupled to communicate with a first destination CGRP, such as for example CGRP 704; an interface circuit, such as for example E-Shim 708 and EMAC 710, coupled between the internal network and the external communication link, the interface circuit having one or more outbound buffers, such as for example buffers 746-756, configured to store data from the internal network wherein the data has at least one of a plurality of transaction types and is destined for the first destination CGRP; the interface circuit configured to send communication streams having packets of the data from the one or more outbound buffers to the first destination CGRP, the packets having a transaction type of the plurality of transaction types; the interface circuit coupled to receive a pause command, such as for example an Ethernet PFC command, from the first destination CGRP wherein the pause command requests pausing transmission of data of a first traffic class; a control circuit, such as for example a circuit that may include RX Pause 734 and CSR 610/620 or arbiter 744, of the interface circuit, the control circuit configured to select a first transaction type for the first traffic class and pause the interface circuit from transmitting data of the first transaction type for a first pause interval; and the control circuit configured to periodically transmit at least one packet of the data of the first transaction type while the pause command is active.

Another implementation may include that the control circuit may be configured to repeat a sequence that includes delay for the first pause interval, transfer a packet of data of the first transaction type upon expiration of the first pause interval, and restart delaying the first pause interval.

An implementation, compatible with any of the previous or following implementations, may include that the pause command may include an active timer field having an active timer interval indicating a time that the pause command is active wherein the active timer interval is larger than the first pause interval, and wherein the pause command is inactive upon one of expiration of the active timer interval or the interface circuit receiving a cancel command to cancel the pause command.

Another implementation, compatible with any of the previous or following implementations, may include that the first pause interval may be stored into the control circuit by an external host.

One skilled in the art will understand that a coarse-grained reconfigurable (CGR) processor (CGRP) may comprise: an array of CGR units (CGRUs) including a first CGRU and a second CGRU; an internal network, such as for example TLN 718, coupled to the array of CGRUs; an external communication link, such as for example Ethernet 705, coupled to communicate with a first destination CGRP; an interface circuit, such as for example a circuit that may include E-Shim 708 and EMAC 710, coupled between the internal network and the external communication link, the interface circuit having one or more outbound buffers, such as for example one or more of buffers 746-756, to receive and store data from the internal network, the data having at least one of a plurality of transaction types wherein the data is destined for the first destination CGRP; a control circuit, such as for example a circuit that may include RX Pause 434 and CSR 610/620 or arbiter 444, of the interface circuit configured to pause the interface circuit from transmitting data of at least one transaction type of the plurality of transaction types for a time interval in response to the interface circuit receiving a pause command, such as for example an Ethernet Pause or PFC, from the first destination CGRP; and the control circuit configured to periodically transmit at least one packet of data of the at least one transaction type while the pause command is active.

Another implementation may include that the pause command may include an active timer field having an active timer interval indicating an active time that the pause command is active and wherein the active timer interval is larger than the time interval.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

The invention claimed is:

1. A coarse-grained reconfigurable (CGR) processor (CGRP) comprising:

an array of CGR units (CGRUs) including a first CGRU and a second CGRU;

an internal network coupled to the array of CGR units;

an external communication link coupled to communicate with a first destination CGRP and a second destination CGRP;

an interface circuit coupled between the internal network and the external communication link wherein the interface circuit includes a transmit circuit and one or more outbound buffers;

the one or more outbound buffers configured to receive data from the internal network and store data as at least one of a plurality of transaction types wherein the data is destined for at least one of the first destination CGRP or the second destination CGRP;

the transmit circuit configured to send communication streams having packets of the data from the one or more outbound buffers to at least one of the first destination CGRP or the second destination CGRP;

a control circuit of the interface circuit wherein the control circuit includes a control register, the control register having control fields respectively corresponding to at least one transaction type of the plurality of transaction types for data in the one or more outbound buffers, and storing control information for the at least one transaction type, the control fields including a first control field for a first transaction type, the first control field having a first traffic class field identifying a traffic class for the first transaction type, a first pause field identifying a pause type for the first transaction type, and a first interval field identifying a first pause interval for the first transaction type;

the interface circuit configured to receive over the external communication link an ethernet pause command to pause transmitting data of a desired traffic class, wherein the ethernet pause command originates from one of the first destination CGRP or the second destination CGRP; and the control circuit configured to pause transmitting data of the first transaction type for the first pause interval in response to the first control field having an asserted state stored in the first pause field and having the desired traffic class stored in the first traffic class field, the control circuit configured to transmit data of the first transaction type from the one of more outbound buffers after expiration of the first pause interval.

2. The CGR processor of claim 1 wherein the ethernet pause command is active for a time that is greater than the first pause interval.

3. The CGR processor of claim 1 wherein the control fields include a second control field for a second transaction type, the second control field having a second traffic class field identifying a traffic class for the second transaction type, a second pause field identifying a pause type for the second transaction type, and a second interval field identifying a second pause interval for the second transaction type; and the control circuit configured to pause transmitting data of the second transaction type for the second pause interval in response to the second control field having an asserted state stored in the second pause field and having the desired traffic class stored in the second traffic class field, the control circuit configured to transmit data of the second transaction type from the one or more outbound buffers after expiration of the second pause interval.

4. The CGR processor of claim 3 wherein the control circuit is configured to also transfer data of a third transaction type from the one or more outbound buffers.

5. The CGR processor of claim 4 wherein the control register has a third control field corresponding to the third transaction type, the third control field having a third traffic class field wherein the desired traffic class is not stored in the third traffic class field.

6. The CGR processor of claim 1 wherein the control circuit is configured to delay for the first pause interval stored in the first interval field, then transfer a packet of data of the first transaction type from the one or more outbound buffers and then restart delaying for the first pause interval.

7. The CGR processor of claim 1 wherein the control circuit is configured to repeat a sequence that includes delay for the first pause interval, transfer a packet of data from the one or more outbound buffers upon expiration of the first pause interval, and restart delaying the first pause interval.

8. The CGR processor of claim 7 wherein the control circuit is configured to repeat the sequence until the interface circuit receives a cancel command to cancel the ethernet pause command wherein the cancel command is an ethernet frame that originates from the one of the first destination CGRP or the second destination CGRP.

9. The CGR processor of claim 1 wherein the external communication link uses an ethernet protocol and the interface circuit is a portion of an ethernet shim (E-Shim).

10. The CGR processor of claim 1 wherein the ethernet pause command is an ethernet control frame.

11. The CGR processor of claim 10 wherein the ethernet control frame is one of an ethernet PFC frame or an ethernet Pause frame.

12. The CGR processor of claim 1 wherein information defining the first pause interval is stored into the control register by a runtime process that is external to the CGRP.

13. The CGR processor of claim 1 wherein the one or more outbound buffers may store data for more than one transaction type.

14. The CGR processor of claim 1 wherein the control circuit includes a plurality of timer circuits including a first timer circuit corresponding to the first transaction type and a second timer circuit corresponding to a second transaction type, wherein the first timer circuit inhibits transferring data for the first pause interval.

15. A coarse-grained reconfigurable (CGR) processor (CGRP) comprising:

an array of CGR units (CGRUs) including a first CGRU and a second CGRU;

an internal network coupled to the array of CGR units;

an external communication link coupled to communicate with a first destination CGRP;

an interface circuit coupled between the internal network and the external communication link, the interface circuit having one or more outbound buffers configured to store data from the internal network wherein the data has at least one of a plurality of transaction types and is destined for the first destination CGRP;

the interface circuit configured to send communication streams having packets of the data from the one or more outbound buffers to the first destination CGRP, the packets having a transaction type of the plurality of transaction types;

the interface circuit coupled to receive a pause command from the first destination CGRP wherein the pause command requests pausing transmission of data of a first traffic class;

a control circuit of the interface circuit, the control circuit configured to select a first transaction type for the first traffic class and pause the interface circuit from transmitting data of the first transaction type for a first pause interval; and the control circuit configured to periodically transmit at least one packet of the data of the first transaction type while the pause command is active.

16. The CGR processor of claim 15 wherein the control circuit configured to periodically transmit at least one packet of the data of the first transaction type includes the control circuit configured to repeat a sequence that includes delay for the first pause interval, transfer a packet of data of the first transaction type upon expiration of the first pause interval, and restart delaying the first pause interval.

17. The CGR processor of claim 15 wherein the pause command includes an active timer field having an active timer interval indicating a time that the pause command is active wherein the active timer interval is larger than the first pause interval, and wherein the pause command is inactive upon one of expiration of the active timer interval or the interface circuit receiving a cancel command to cancel the pause command.

18. The CGR processor of claim 15 wherein the first pause interval is stored into the control circuit by an external host.

19. A coarse-grained reconfigurable (CGR) processor (CGRP) comprising:

an array of CGR units (CGRUs) including a first CGRU and a second CGRU;

an internal network coupled to the array of CGR units;

an external communication link coupled to communicate with a first destination CGRP;

an interface circuit coupled between the internal network and the external communication link, the interface circuit having one or more outbound buffers to receive and store data from the internal network, the data having at least one of a plurality of transaction types wherein the data is destined for the first destination CGRP;

a control circuit of the interface circuit configured to pause the interface circuit from transmitting data of at least one transaction type of the plurality of transaction types for a time interval in response to the interface circuit receiving a pause command from the first destination CGRP; and the control circuit configured to periodically transmit at least one packet of data of the at least one transaction type while the pause command is active.

20. The CGR processor of claim 19 wherein the pause command includes an active timer field having an active timer interval indicating an active time that the pause command is active and wherein the active timer interval is larger than the time interval.

* * * * *